United States Patent
Joo

(10) Patent No.: US 7,748,136 B2
(45) Date of Patent: Jul. 6, 2010

(54) REMOTE CENTER COMPLIANCE DEVICE WITH MEASURING SENSOR

(76) Inventor: Sang-Wan Joo, 104-1302, Jugong Greenvill Apt., Seoksu-dong, Manan-gu, Anyang-si, Gyeonggi-do 430-760 (KR)

( * ) Notice: Subject to any disclaimer, the term of this patent is extended or adjusted under 35 U.S.C. 154(b) by 326 days.

(21) Appl. No.: 11/763,641

(22) Filed: Jun. 15, 2007

(65) Prior Publication Data

US 2007/0293077 A1    Dec. 20, 2007

(30) Foreign Application Priority Data

Jun. 16, 2006   (KR) .................. 10-2006-0054540
Jun. 22, 2006   (KR) .................. 10-2006-0056211
Jun. 22, 2006   (KR) .................. 10-2006-0056213

(51) Int. Cl.
  *G01B 5/25*   (2006.01)
  *B23P 19/00*  (2006.01)

(52) U.S. Cl. .......................... 33/644; 33/520

(58) Field of Classification Search ............ 33/520, 33/533, 644, 645
See application file for complete search history.

(56) References Cited

U.S. PATENT DOCUMENTS

| | | | | |
|---|---|---|---|---|
| 4,098,001 A | * | 7/1978 | Watson .................. | 33/644 |
| 4,316,329 A | * | 2/1982 | Watson .................. | 33/644 |
| 4,440,031 A | * | 4/1984 | De Fazio ............... | 33/520 |
| 4,517,744 A | * | 5/1985 | Consales et al. ......... | 33/644 |
| 4,848,757 A | * | 7/1989 | De Fazio ............... | 33/520 |
| 4,897,930 A | * | 2/1990 | Cusack ................. | 33/644 |
| 5,619,782 A | * | 4/1997 | Tanaka et al. .......... | 29/407.1 |
| 6,408,531 B1 | * | 6/2002 | Schimmels ............. | 33/644 |
| 6,473,985 B2 | * | 11/2002 | Won et al. ............. | 33/644 |
| 6,792,689 B2 | | 9/2004 | Joo et al. | |
| 7,259,574 B2 | * | 8/2007 | Shrikrishna ............ | 324/681 |
| 7,421,799 B2 | * | 9/2008 | Joo ..................... | 33/644 |

FOREIGN PATENT DOCUMENTS

JP        2001079716 A   *  3/2001
KR   10-2001-0085013 A      9/2001

* cited by examiner

*Primary Examiner*—R. A. Smith
(74) *Attorney, Agent, or Firm*—Rabin & Berdo, P.C.

(57) ABSTRACT

A remote center compliance device is provided. The remote center compliance device includes a measuring sensor disposed at a limiter, a measuring block, or an elastic body to measure a force-insertion force or a location displacement of a force-insertion apparatus.

44 Claims, 27 Drawing Sheets

REMOTE CENTER COMPLIANCE DEVICE WITH MEASURING SENSOR

BACKGROUND OF THE INVENTION

1. Field of the Invention

The present invention relates to a remote center compliance device, and more particularly, to a remote center compliance device having a measuring sensor provided at a limiter, a measuring block, or an elastic body to measure a correction amount of a force-insertion or location error of a force-insertion apparatus.

2. Description of the Related Art

Generally, in mass-producing various machinery parts (e.g., transmission, engine, steering system, motor, gearbox, etc.), precise parts such as bearing, oil seal, bush, precise shaft, and pin are automatically inserted into bearing bore, housing, shaft hole, and pin hole by using robots or dedicated assembly apparatus.

FIG. 1 is a cross-sectional view of a conventional force-insertion apparatus. Referring to FIG. 1, a boss support 2 is provided on a frame 1, and a boss B is fixed to the boss support 2. A lifter 3 is provided above the boss support 2, and a part A to be force-inserted into the boss B is fixed to the lifter 3. The lifter 3 lifts to insert the part A into the boss B forcibly. A guide 4 supports the lifting of the lifter 3. A hydraulic system 5 generates a lifting force to lift the lifter 3 along the guide 4.

A hydraulic force generated from a hydraulic pump of the hydraulic system 5 is provided to a hydraulic cylinder and the hydraulic cylinder moves up or down. The lifter 3 fixed to the hydraulic cylinder moves up or down along a lifting direction of the hydraulic cylinder. The lifter 3 has a vertical lifting force due to the guide 4, and the part A fixed to the lifter 3 is force-inserted into the boss B fixed to the boss support 2.

In addition, the boss B into which the part A is force-inserted is extracted from the boss support 2 by a separate extracting device. After a new boss B is placed, the lifter 3 rises and a new part A is fixed. In this way, the force insertions are successively performed.

The boss B refers to parts having a space such as housing, pulley, shaft hole, and pin hole. The force-insertion part A refers to parts to be force-inserted into a space such as bearing, oil seal, bushing, pin, and shaft.

However, a conventional force-insertion apparatus performs only a force-insertion work to forcibly insert the force-insertion part into the boss using a hydraulic pressure. Therefore, when the centers of the boss and the force-insertion part are not matched with each other, the force insertion causes the boss or the force-insertion part to be damaged, or the force-insertion apparatus is damaged.

One of approaches to solving these problems is disclosed in Korean Patent Laid-open Publication No. 2001-85013, filed by the present applicant and entitled "REMOTE CENTER COMPLIANCE DEVICE FOR FORCED INSERTION". According to this application, the remote center compliance device includes an upper structure, a lower structure, and a plurality of elastic bodies between the upper structure and the lower structure, and a limiter. The remote center compliance device uses the principle of elastic center. The principle of elastic center is a mechanical principle that when an elastic is located near an object belonging to the remote center compliance device and an external force acting on the object passes through the elastic center, only a translation is performed in a direction of the external force without performing a rotation and, when a moment acts on the elastic center, the object performs only a rotation centering on the elastic center without performing a translation.

Therefore, when the remote center compliance device proposed by the present applicant is attached to the conventional force-insertion apparatus, that is, the remote center compliance device is fixed to the lifter 3, the boss B and the force-insertion part A are arranged centering on the central axis by the translation of the elastic body and are mutually force-inserted.

However, the force-insertion apparatus with the remote center compliance device or the conventional force-insertion apparatus has no unit that can measure a force-insertion force of the boss and the force-insertion part. Therefore, the force-insertion force of the part force-inserted into the boss cannot be measured.

The purpose of measuring the force-insertion force of the boss and the force-insertion part is to determine the force-insertion quality and lifetime of the boss and the force-insertion part according to how much the force-insertion part is inserted into the boss by the force-insertion force. If the force-insertion force of the boss and the part does not reach an allowable error, the part is easily released from the boss. If the force-insertion force exceeds the allowable error, the boss and the part are damaged by an excessive force insertion.

FIG. 2 is a cross-sectional view of a force-insertion apparatus including a conventional remote center compliance device and a load cell. Referring to FIG. 2, the force-insertion apparatus including the remote center compliance device of the present applicant and the load cell can correct the center error and measure the force-insertion force. In the force-insertion apparatus, the remote center compliance device 10 is provided under the lifter 3, and the load cell 20 is provided above the lifter 3.

FIG. 3 is an enlarged view illustrating the assembly of the remote center compliance device and the load cell of FIG. 2. Referring to FIG. 3, the load cell 20 is provided inside a lift platform of the lifter 3 lifting along a guide rail of the guide 4. A cover 22 transfers a weight to the load cell 20. In the remote center compliance device 10, a tool for replacing and fixing the force-insertion part A is provided under the cover 22. A bracket 12 fixes the cover to the lift platform.

However, the force-insertion apparatus including the remote center compliance device and the load cell has problems in that as the number of parts increases, the price of the products rises, a manufacturing process and structure are so complicated that the maintenance cost increases, and a wider installation space is occupied, thus lowering the product competitiveness.

In addition, a guide member called an LM guide is widely used as the guide 4. However, the LM guide is so expensive that the design and manufacturing cost of the apparatus using the LM guide will increase.

In the conventional force-insertion apparatus of FIG. 1, when the load cell 20 is mounted on the lifter 3 but the remote center compliance device 10 is not used, the force-insertion force acting between the part A and the boss B cannot be correctly measured because of the location error of the central axes.

Especially, in case where the remote center compliance device 10 is not mounted and the boss B and the part A have the center error, if the force insertion is performed in such a state that a lower portion of the initial force-insertion part A is in contact with an upper portion of the boss B, the force-insertion force measured in the load cell 20 is a sum of a force-insertion force of the lifter, a deforming force of the boss B and the part A due to the center error, and an unnecessary frictional force of the hydraulic cylinder and the guide.

On the other hand, as illustrated in FIGS. 2 and 3, when the remote center compliance device 10 corrects the center error of the part A and the boss B and force-inserts them, the actual force-insertion force alone is measured in the load cell 20. Therefore, compared with the force-insertion apparatus of FIG. 1, the force-insertion force is more correctly measured. However, as the number of parts increases, the price of the products increase, the manufacturing process and structure are so complicated that the maintenance cost increases, and a wider installation space is occupied, thus lowering the product competitiveness.

SUMMARY OF THE INVENTION

An object of the present invention is to provide a remote center compliance device with a measuring sensor attached to a limiter. The measuring sensor measures a deformation rate generated by a force-insertion force acting on the limiter, and a displacement sensor measures a force-insertion force or a location displacement value and provides the measured values to users.

Another object of the present invention is to provide a remote center compliance device with a measuring block, which easily corrects the force insertion or the location, easily calculates the force-insertion force and the location displacement value, and provides the calculated values to users.

A further object of the present invention is to provide a remote center compliance device with a measuring sensor, which easily calculates the force-insertion force or the location displacement value.

According to an aspect of the present invention, there is provided a remote center compliance device for correcting a center error between a boss and a force-insertion part through a translation based on an elastic enter principle includes: upper and lower structures; a plurality of elastic bodies and a plurality of limiters disposed between the upper and lower structures; and a force-insertion force measuring sensor attached to the limiters to calculate a force-insertion force acting on the limiters.

The force-insertion force measuring sensor may be attached to a side surface of the limiter (30), or a load cell inserted and fixed to an upper or lower portion of the limiter (30).

The limiter (30) may include a notch hole (34) for amplifying a variation caused by a force insertion.

A location displacement measuring unit may be disposed between the upper structure (13) and the lower structure (14) to measure a relative location displacement between the upper structure (13) and the lower structure (14).

The location displacement measuring unit may include a measuring sensor for measuring a correction amount using an elastic plate, or a plurality of slide-type displacement measuring sensors arranged in perpendicular to one another.

A measuring block (110) may be disposed between the upper and lower structures (13, 14), and a force-insertion force measuring sensor (40) may be disposed at one side of the measuring block (110).

The measuring block (110) may include: a fixing portion (112) fixed to the upper structure (13); and a measuring portion (114) disposed under the fixing portion (112) and fixed to a location close to the lower structure (14), with being spaced apart to a predetermined height by an allowable deformation gap (16), the measuring portion (114) providing the force-insertion force measuring sensor (40).

The measuring portion (114) may include a recess (114i a) in the center so as to easily attaching the force-insertion force measuring sensor (40), a protrusion (114b) is formed in a periphery of the recess (114a), the protrusion (114b) having a sloped surface (114a) inclined from the end to the center so as to provide a constant bending due to the force-insertion force acting on the lower structure (14).

The measuring block 110 may include a plurality of insertion holes (118).

The measuring block (120) may include a fixing portion (122) fixed to the upper structure (13), and a measuring portion (124) disposed under the fixing portion (122) and spaced apart by an allowable deformation gap (126); the measuring block (124) includes a recess (124a) for the force-insertion force measuring sensor (40) in the center, and a protrusion (124b) formed in a periphery of the recess (124a); the protrusion (124b) is cut into a plurality of unit pieces at regular intervals; the fixing portion (122) and the measuring portion (124) include a plurality of insertion holes (128) into which a plurality of limiters (30) are inserted, and a plurality of mount spaces (129) at a location where the elastic body (16) is disposed; and the remote center compliance device further includes an auxiliary block (130) in the mount spaces, the auxiliary block (130) being fixed between the unit pieces of the measuring portion by a coupling member so as to fix one end of the elastic body (16).

An upper portion of the auxiliary block (130) may be fixed to the measuring portion (124), with being spaced apart from the upper structure (13) by a predetermined distance.

The protrusion (124b) may include a sloped surface (124c) inclined from the end to the center so as to provide a constant bending due to the force-insertion force acting on the lower structure (14).

The allowable deformation gaps (116,126) may restrict the bending of the measuring portions (114, 124) in order not to exceed an elastic limit of a material such that the measuring portions (114, 124) are bent by a repulsive force based on the force-insertion force acting on the lower structure (14) and is restored to an original state.

The remote center compliance device may further include a process space between the fixing portion and the measuring portion in the deformation gaps (116, 126) to a predetermined height in order for easy process, and the fixing block (40) is fixed in the process space such that the deformation gap does not exceed the elastic limit of the material by height deviation of the process space and the fixing block (140).

The remote center compliance device may further include a location displacement measuring unit disposed between the upper structure (13) and the lower structure (14) to measure a relative location displacement between the upper structure (13) and the lower structure (14).

The measuring block (520) may include: a fixing portion (522) fixed to the bottom of the upper structure (13); and a cross-shaped measuring portion (524) disposed under the fixing portion (522).

The fixing portion (522) may include a protrusion (526) in the center and is tightly connected to a bottom surface (13b) of the upper structure (13), a recess surface (528) is formed in a direction of the measuring portion (524), and the measuring sensor (40) is attached to the recess surface (528).

The cross-shaped measuring portion (524) may include a measuring portion (523) recessed by at least one step (532) at a cross-shaped lower end, and the force-insertion force measuring sensor (40) is attached thereto.

The cross-shaped measuring portion (524) may include a through hole (524d) formed in an inside of the cross-shaped measuring portion (524).

According to another aspect of the present invention, a remote center compliance device for correcting a center error between a boss and a force-insertion part through a translation based on an elastic enter principle includes: upper and lower structures (13, 14); a plurality of elastic bodies (210)

and a plurality of limiters (30) disposed between the upper and lower structures (13, 14); a plurality of disks (212) disposed between the upper and lower structures (13, 14) and having a predetermined slope; first and second supports (214, 216) stacked at predetermined distance and disposed on both ends of the disks (212), the first and second supports (214, 216) including a protrusion (216a) and a recess (214a) having the same slope and a plurality of coupling holes; an elastic body (210) including a filler (218) for elastically connecting the disks (212) stacked between the first and second supports (214, 216), the elastic body (210) being fixed to the upper and lower structures (13, 14) through the coupling holes; a limiter (30) disposed between the upper and lower structures (13, 14), the limiter (30) including a screw part (336) fixed to one of the upper and lower structures, and a head part (332) for spacing the other of the upper and lower structures by a predetermined distance; and a force-insertion force measuring sensor (40) attached to the limiter (30) to calculate the force-insertion force acting on the limiter (30).

The force-insertion force measuring sensor may be attached to a side surface of the limiter (30), or a load cell inserted and fixed to the upper or lower portion of the limiter (30).

The disk (212) may have the slope (θ) inclined from an inner side to an outer side.

The slope (θ) of the disk (212) may range from 2° to 15°.

The remote center compliance device may further include: upper and lower structures (310, 320) disposed in the first and second supports (214, 216) of the elastic body (210) and connected together by a coupling member; and a limiter (30) disposed between the upper and lower structures (310, 320), the limiter (30) including a screw part (336) fixed to one of the upper and lower structures (310, 320), and a head part (332) for spacing the other of the upper and lower structures (310, 320) by a predetermined distance, such that the elastic body (210) is prevented from buckling and damage due to a tensile force and a force-insertion force caused by weight of the limiter 30.

The upper structure (310) may include a plurality of coupling holes at the upper portion (312), a flange (314) extending downward, and a receiving space (316) defined by an inner side of the flange (314), the receiving space (316) receiving the elastic body (210) and being connected to the first support (214) of the elastic body (210), such that the elastic body (210) is not interfered during a translation movement; and the lower structure (320) is coupled to the second support (216) of the elastic body (210) and disposed in the receiving space (316) of the flange (314), such that the lower structure (320) is spaced apart from the inner wall of the flange (314) in order for the elastic body (210) not to contact the inner wall of the flange (314) during the translation movement of the elastic body (210).

The remote center compliance device may further include a plurality of wrench grooves (338) formed at the head part (332) of the limiter (30) and into which a wrench is inserted to transfer a coupling force to make an easy connection of the screw (336) to one of the upper and lower structures (310, 320).

The upper structure (310) may include protrusions (314a) at a lower portion, the protrusions (314a) having an insertion space recessed upward from an end portion; the lower structure (320) includes a lower portion (322), a protrusion (324) producing from the lower portion (322) to a predetermined height, a coupling hole (326) defined in the center of the protrusion (324), and a plurality of rotation preventing members (328) inserted into the insertion space of the protrusion (314a) at a periphery of the lower portion (322).

According to further aspect of the present invention, a remote center compliance device for correcting a center error between a boss and a force-insertion part through a translation based on an elastic enter principle includes: upper and lower structures (13, 14); a plurality of elastic bodies (16) and a plurality of limiters (30) disposed between the upper and lower structures (13, 14); and a displacement sensor provided at one of the upper and lower structures (13, 14) to measure a displacement of the limiters.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Embodiments of the present invention will be described below in detail with reference to the accompanying drawings.

Embodiments of Limiter

Figure 1:
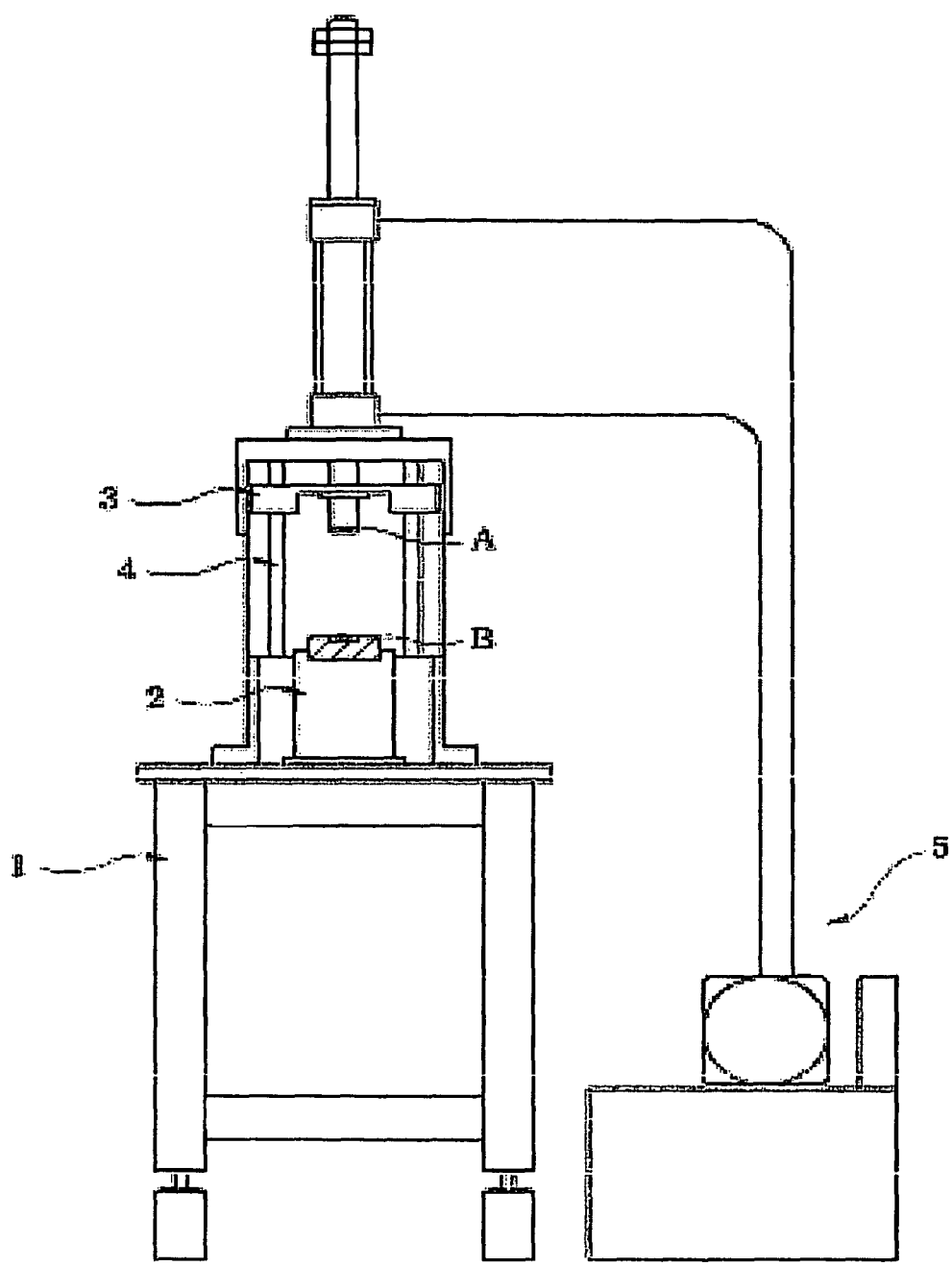
FIG. 1 is a cross-sectional view of a conventional force-insertion apparatus.
Figure 2:
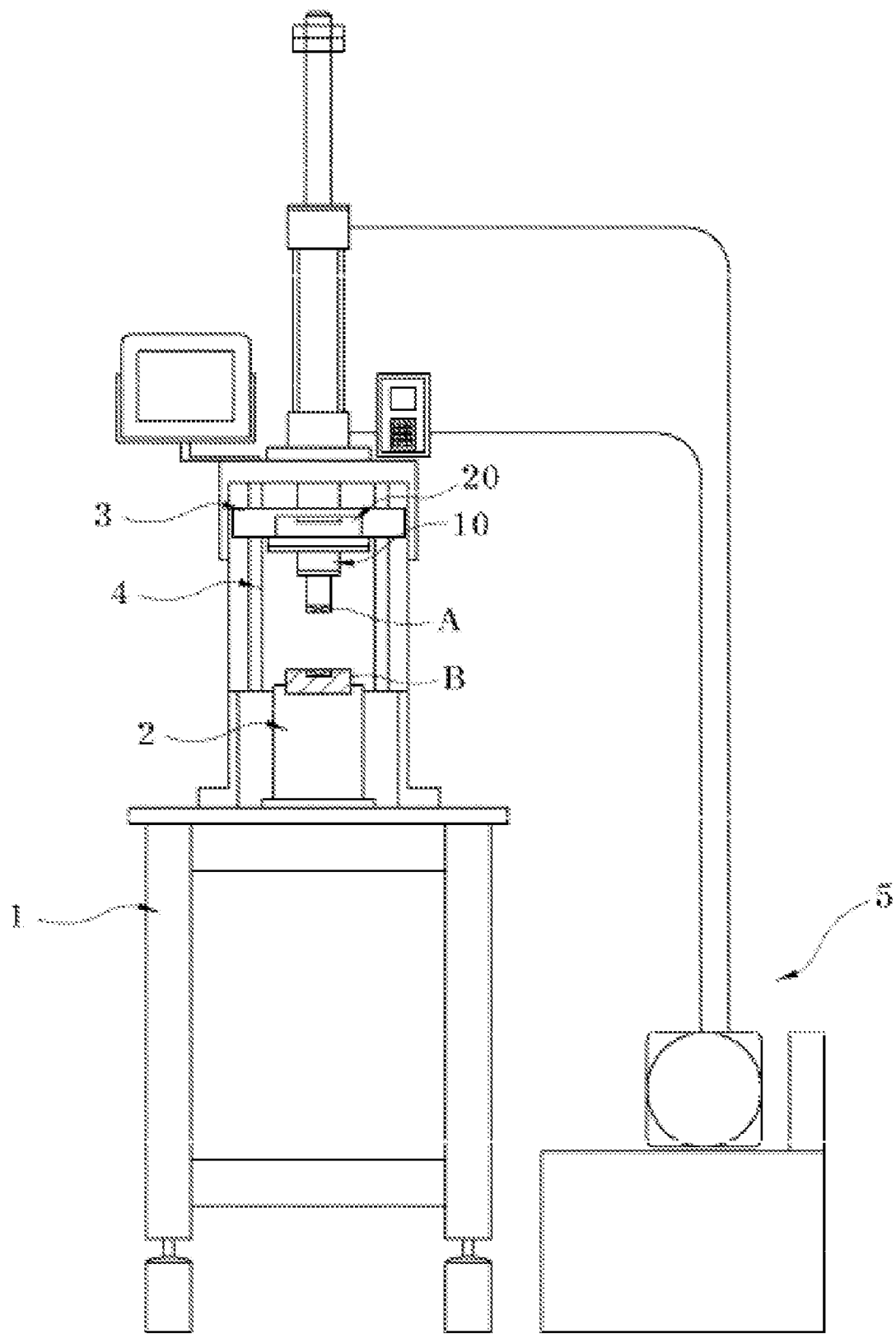
FIG. 2 is a cross-sectional view of a conventional force-insertion apparatus having a remote center compliance device and a load cell.
Figure 3:
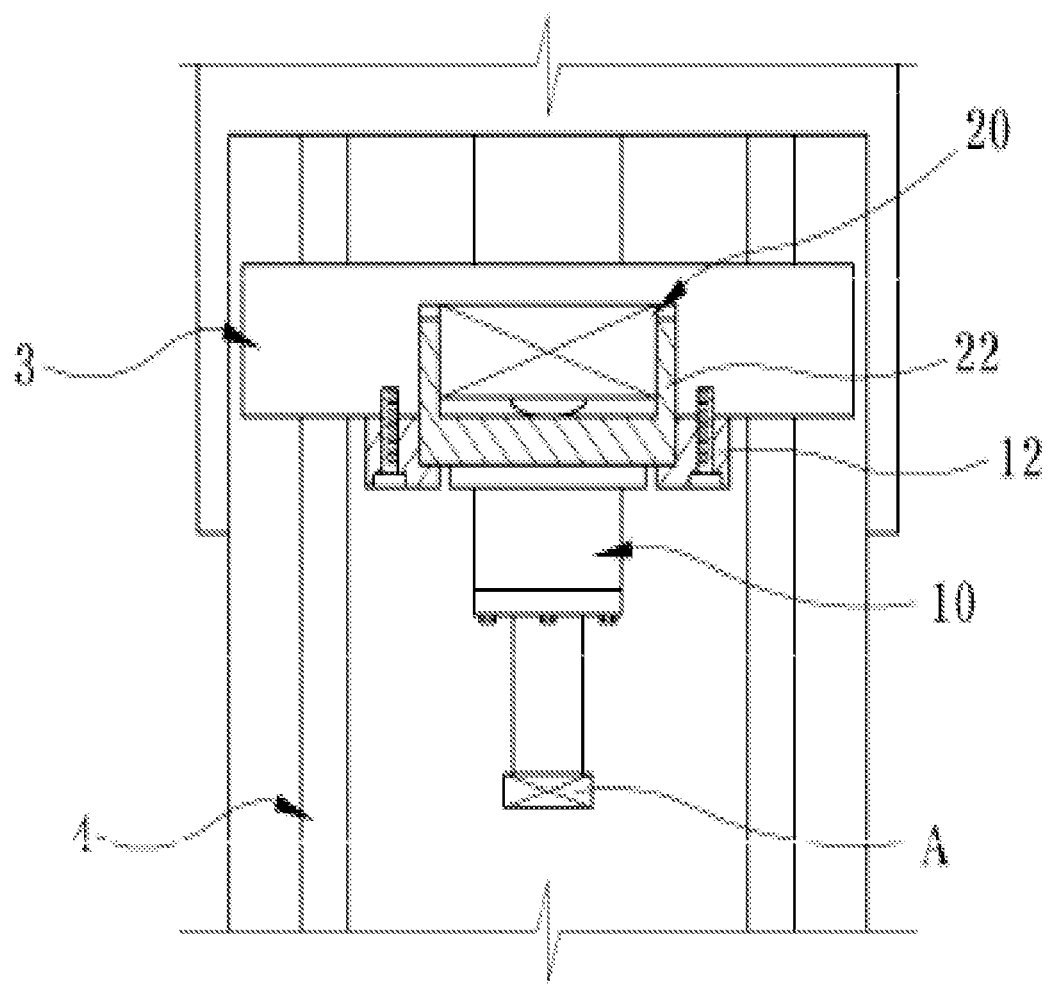
FIG. 3 is an enlarged cross-sectional view showing an assembly of the remote center compliance device and the load cell of FIG. 2.
Figure 4:
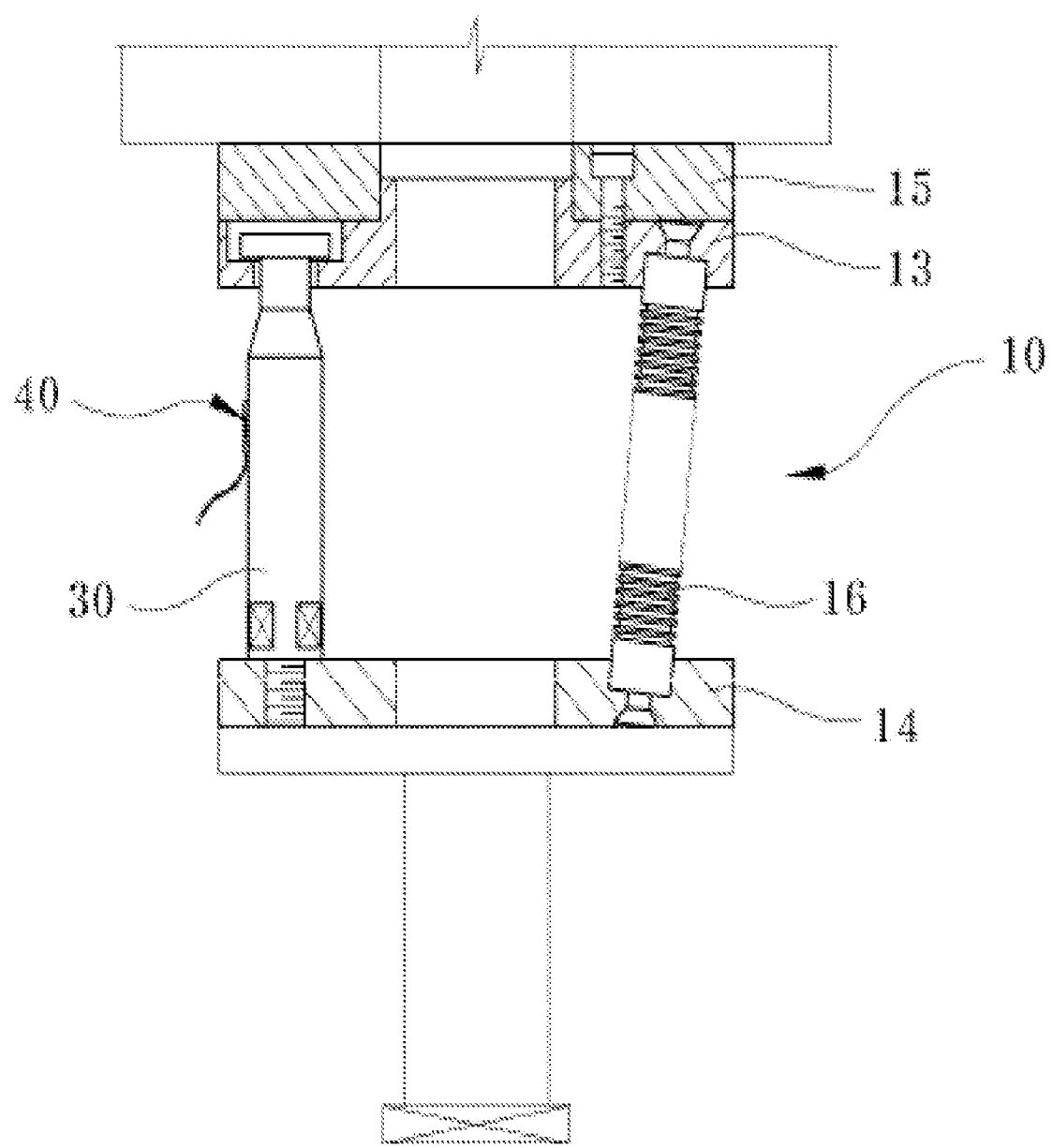
FIG. 4 is an assembled cross-sectional view of a remote center compliance device with a measuring sensor in a limiter according to a first embodiment of the present invention.

FIG. 4 is an assembled cross-sectional view of a remote center compliance device with a force-insertion force measuring sensor in a limiter according to a first embodiment of the present invention. Referring to FIG. 4, the remote center compliance device 10 includes upper and lower structures 13 and 14, a plurality of elastic bodies 16 provided between the upper and lower structures 13 and 14, and a plurality of limiters 30. Since the connection relationship and the operational effect of the upper and lower structures 13 and 14, the elastic bodies 16, and the limiters 30 are disclosed in Korean Patent Laid-open Publication No. 2001-85013 entitled "REMOTE CENTER COMPLIANCE DEVICE WITH FORCED INSERTION", their detailed description will be omitted.

The limiter 30 includes the force-insertion force measuring sensor 40 which may be configured with an electrical strain gage or a piezoelectric element that can detect a fine variation.

In addition, the force-insertion force measuring sensor 40 is provided to each of the limiters 30. Further, a plurality of force-insertion force measuring sensors 40 are attached to each of the limiter in order to measure the force-insertion force correctly.

Meanwhile, although not shown, the force-insertion force measuring sensor 40 can measure a variation of the limiter 30, calculate the force-insertion force, outputs the calculated force-insertion force on an external display device, and determines a success/fail of the press fit of the boss and the force-insertion part according to the calculated force-insertion force.

Figure 5:
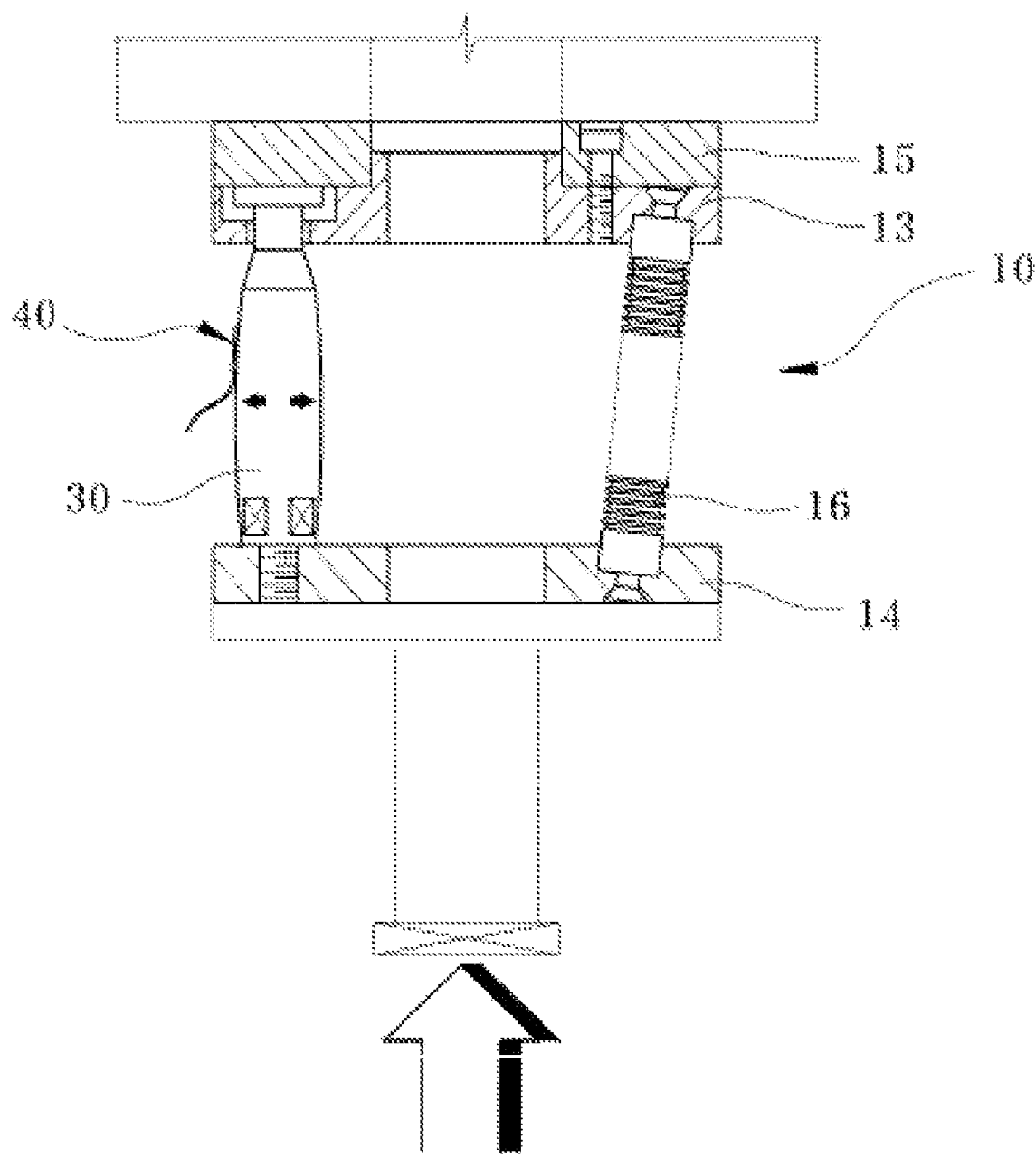
FIG. 5 is a cross-sectional view showing a variation of a limiter when a force-insertion force is applied to the remote center compliance device of FIG. 4.

FIG. 5 is a cross-sectional view showing the variation of the limiter when the force-insertion force is applied to the remote center compliance device of FIG. 4. Referring to FIG. 5, the remote center compliance device 10 moves downward in order to forcibly insert the part into the boss. At this point, the force-insertion force is generated between the boss and the part. The generated force-insertion force is transferred to the limiter 30 through the part fixing frame arranged vertically and the lower structure 14.

When the elastic body 16 is compressed and rises to a predetermined height so that it is closely attached to the bottom of the lifter, the limiter 30 is compressed and deformed by the rising force-insertion force and the lower stopper of the lifter.

Therefore, the force-insertion force measuring sensor 40 calculates the variation and the force-insertion force according to the compressed and deformed amount, and the calculated force-insertion force is outputted on an external display device (not shown).

Figure 6:
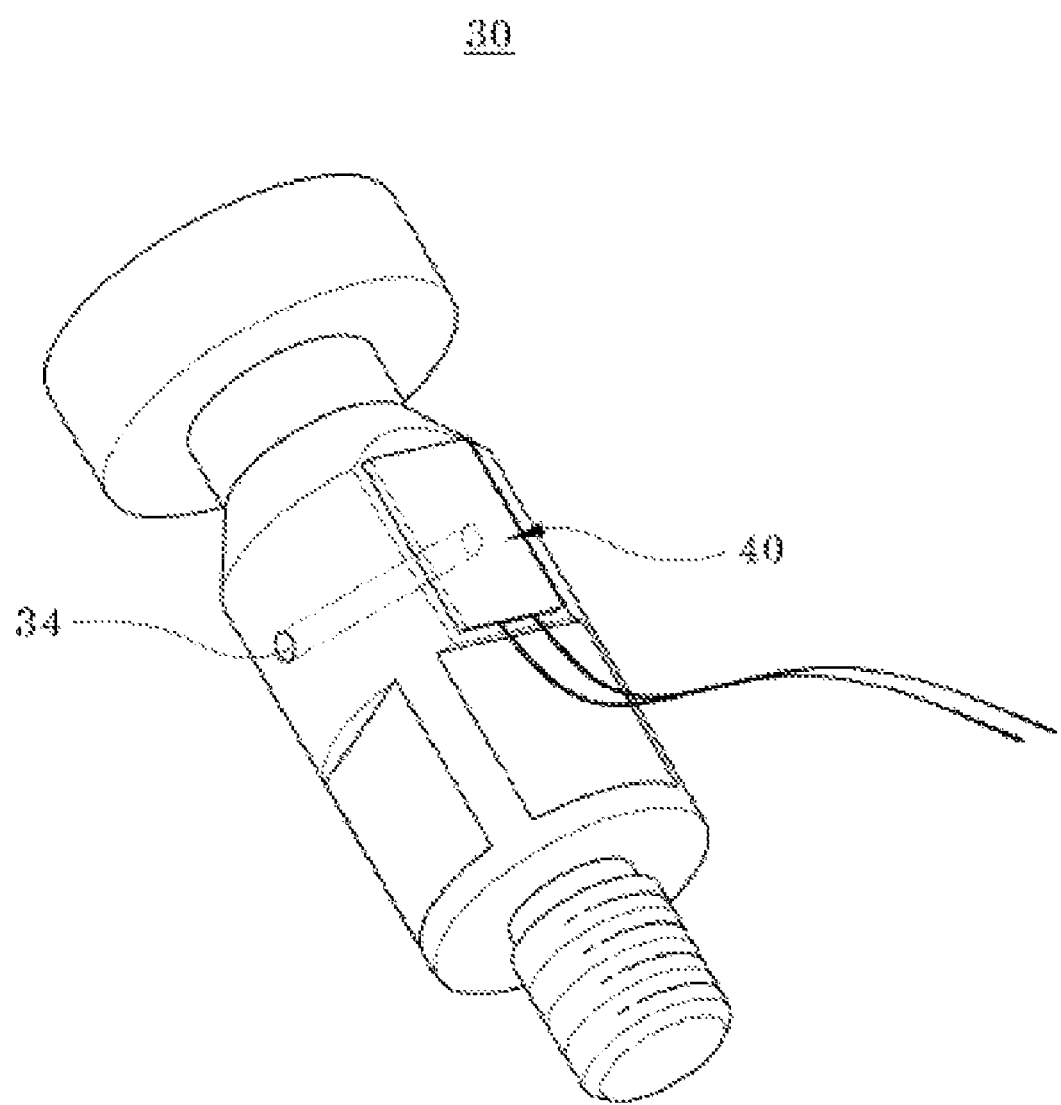
FIG. 6 is a perspective view of a limiter according to a second embodiment of the present invention.

FIG. 6 is a perspective view of a limiter according to a second embodiment of the present invention. Referring to FIG. 6, the limiter 30 includes a notch hole 34 at one side. A force-insertion force measuring sensor 40 is attached to a location having the greatest compression variation around the notch hole 34. Since the variation of the limiter 30 is amplified by the notch hole 34, the force-insertion force is more correctly measured.

In addition, the conventional limiter has a plurality of flat portions about the periphery of the limiter. The conventional limiter is connected by rotating using a spanner at the flat portions. However, according to the present invention, the flat portions are not formed, and the limiter 30 is connected using a lever inserted into the notch hole 34.

Figure 7A:
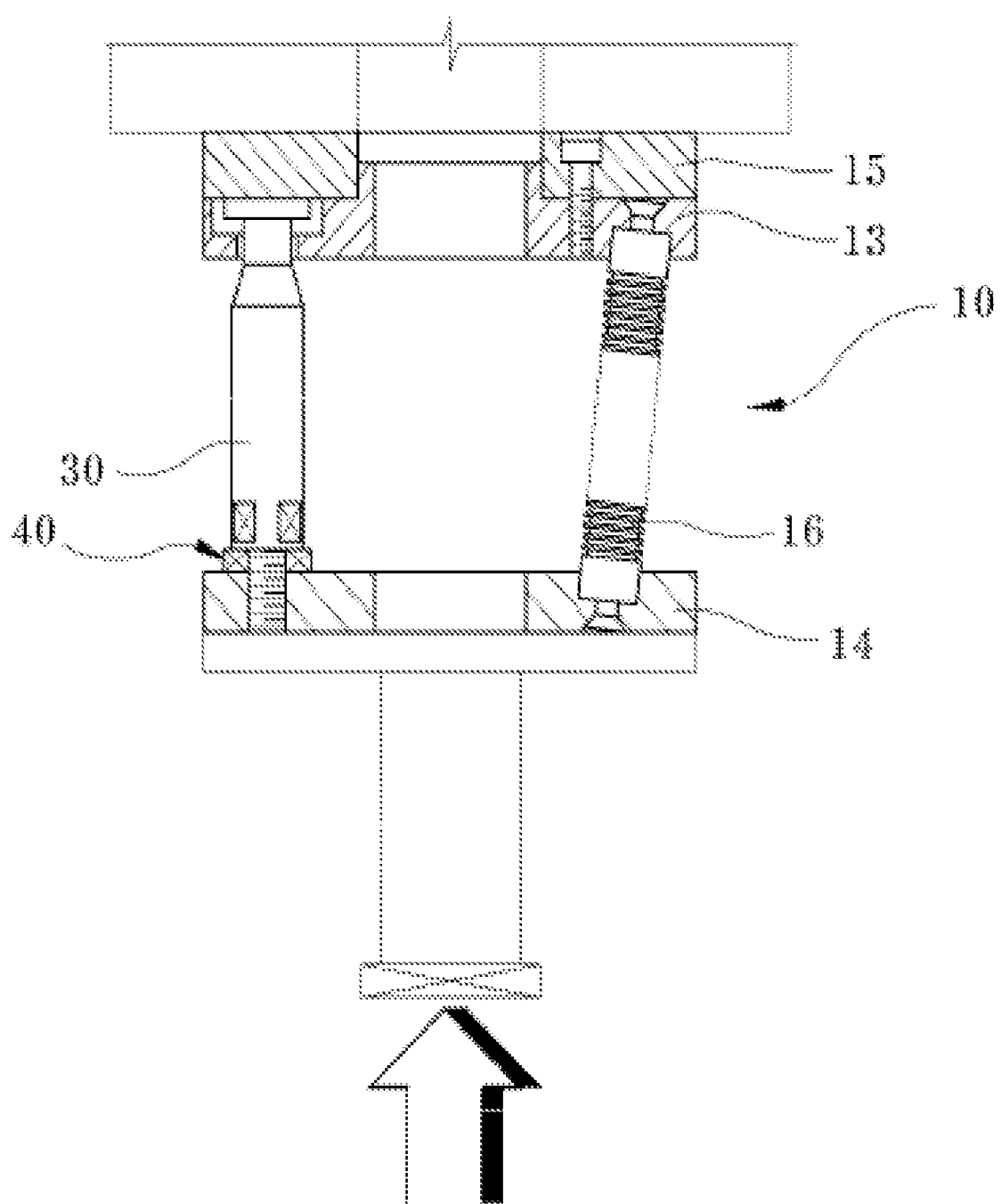
FIG. 7A is a cross-sectional view showing a usage state of a limiter according to a third embodiment of the present invention.

FIG. 7A is a cross-sectional view of a limiter according to a third embodiment of the present invention. Referring to FIG. 7A, a force-insertion force measuring sensor 40 is fixedly inserted between a limiter 30 and a lower structure 14. Preferably, a load cell is used as the force-insertion force measuring sensor 40.

Figure 7B:
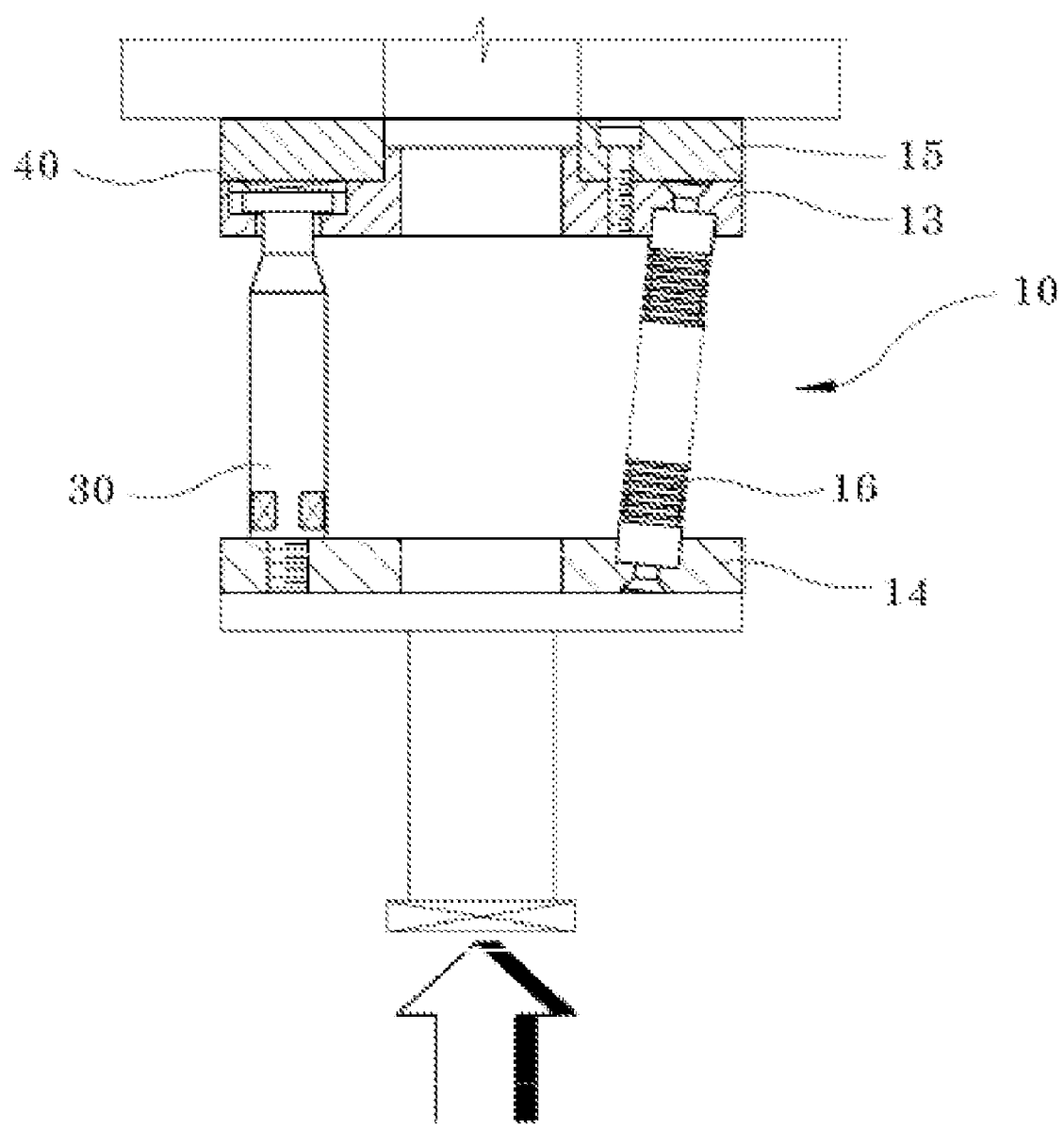
FIG. 7B is a cross-sectional view showing a usage state of a limiter according to a fourth embodiment of the present invention.

FIG. 7B is a cross-sectional view showing a usage state of a limiter according to a fourth embodiment of the present invention. Referring to FIG. 7B, a remote center compliance device 10 moves down to forcibly insert the part into the boss. At this point, a force-insertion force is generated between a boss and a part. The generated force-insertion force is transferred to the limiter 30 through a part fixing frame arranged vertically and a lower structure 14.

When an elastic body 16 is compressed and rises to a predetermined height, an upper portion of the limiter 30 compresses the force-insertion force measuring sensor 40 closely attached to the lower portion of the upper structure 13. The force-insertion force measuring sensor 40 measures the force-insertion force. Preferably, a load cell is used as the force-insertion force measuring sensor 40.

Figure 8:
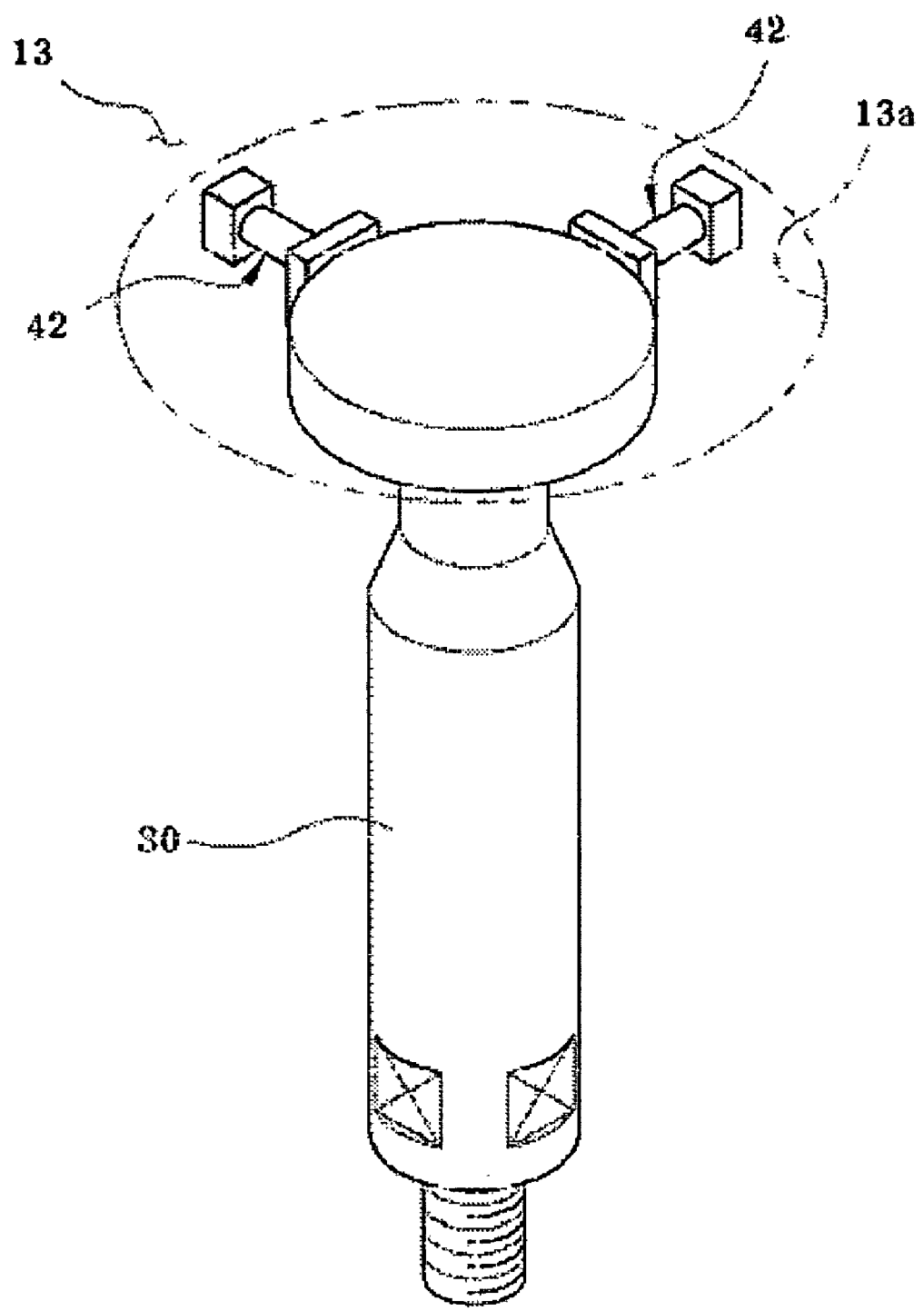
FIG. 8 is a perspective view of a location displacement measuring unit according to a first embodiment of the present invention.

FIG. 8 is a perspective view of a location displacement measuring unit according to a first embodiment of the present invention. Referring to FIG. 8, displacement sensors 42 measuring a horizontal displacement at an upper portion of the limiter are arranged perpendicular to each other. The displacement sensors 42 measure a correction amount of a location error in real time during the force insertion, and outputs the measured correction amount on an external display device. In addition, it is apparent that the location displacement measuring unit of FIG. 8 can be applied to any remote center compliance device using the limiter 30, as well as a remote center compliance device receiving a measuring block and a remote center compliance device applying one elastic body.

Figure 9:
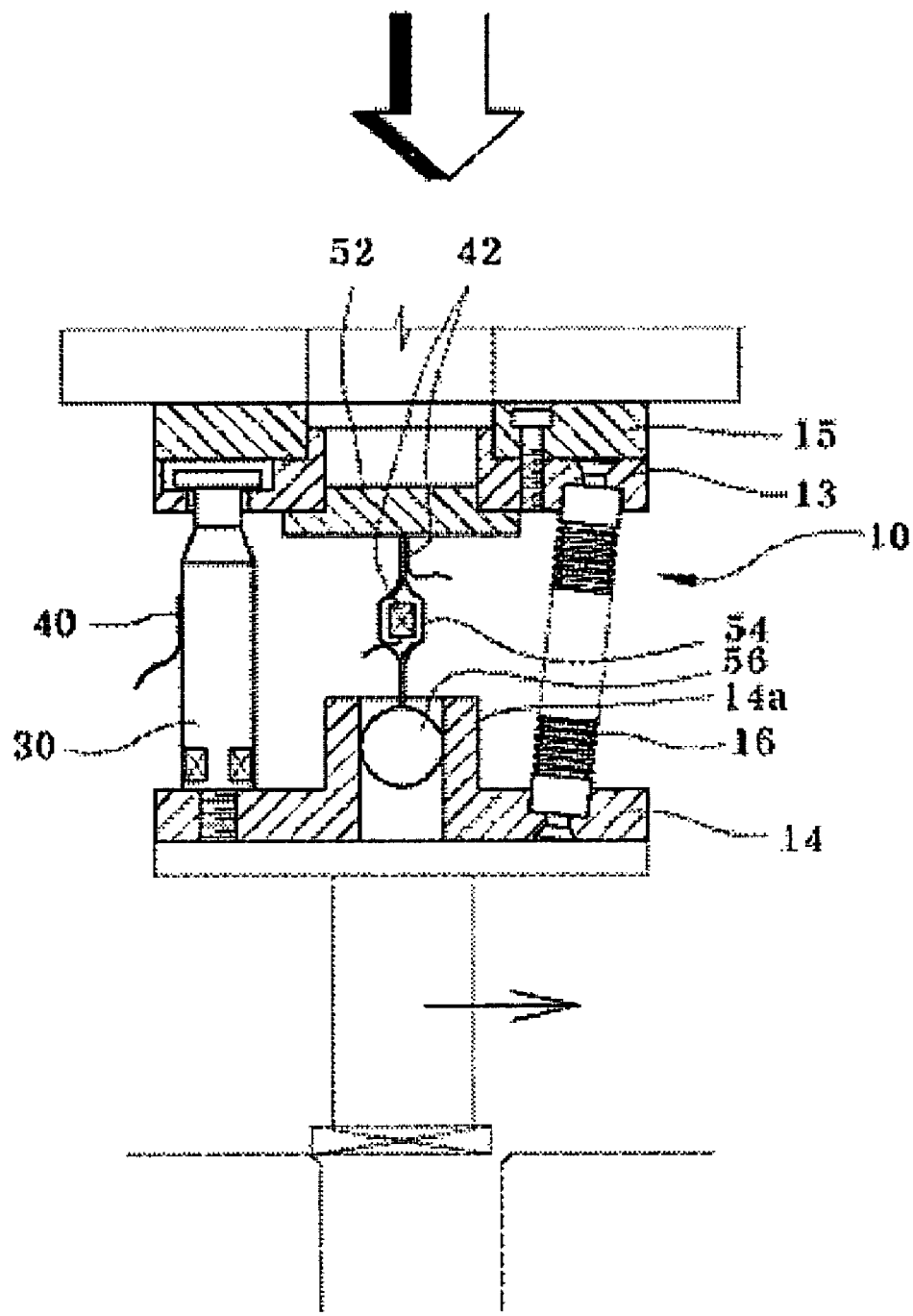
FIG. 9 is a cross-sectional view showing an assembled state of a location displacement measuring unit according to a second embodiment of the present invention.
Figure 10:
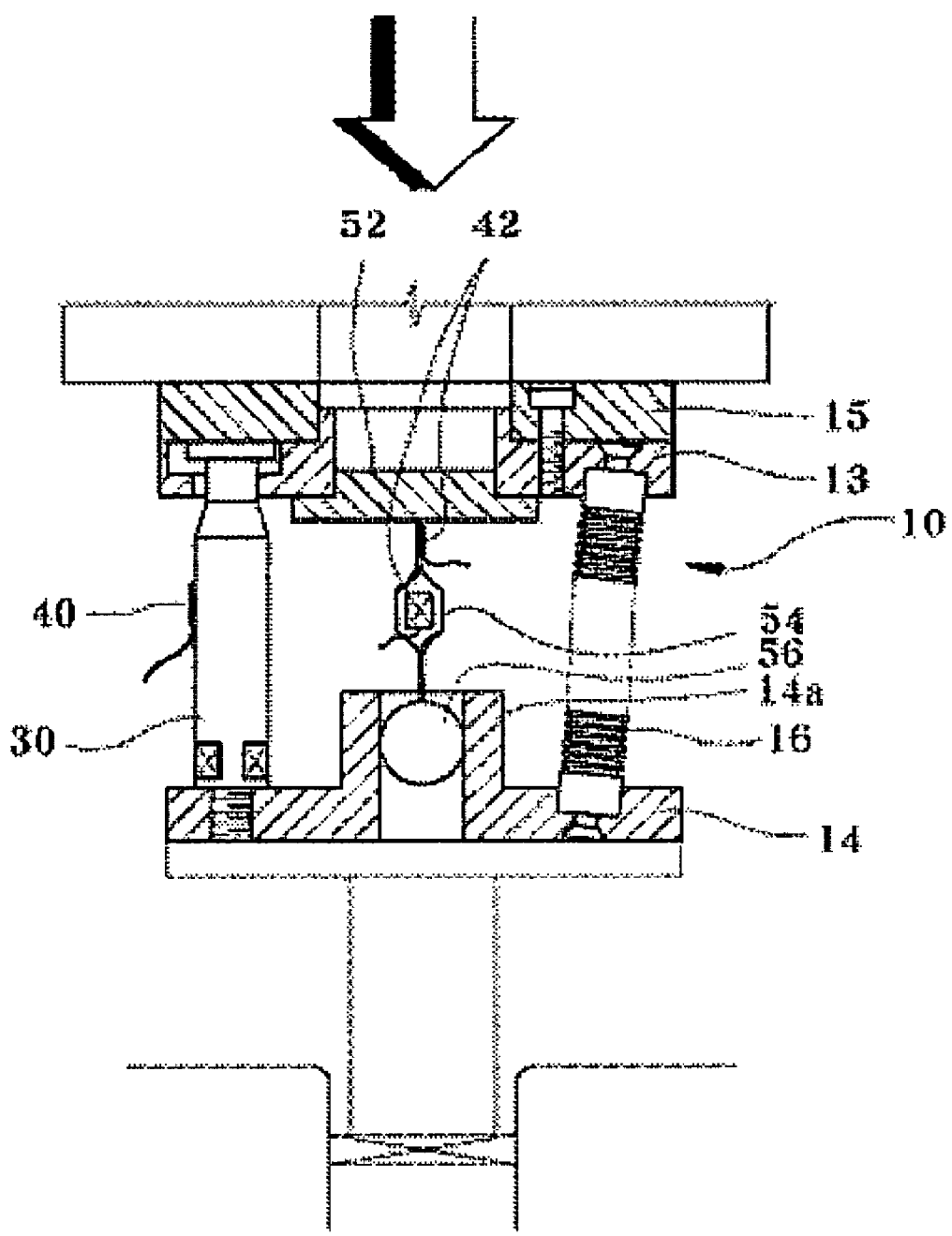
FIG. 10 is a cross-sectional view showing a usage state of the location displacement measuring unit of FIG. 9.

FIGS. 9 and 10 are cross-sectional view showing the location displacement measuring unit disposed between the upper structure 13 and the lower structure 14. Referring to FIGS. 9 and 10, when the error correction is performed on the lower structure 14 so as to match the centers of the boss and the force-insertion part, a location of a ball probe holder 14a fixed to the lower structure 14 moves horizontally by a predetermined corrected amount. Therefore, an elastic plate 54 fixed vertically to a displacement sensor bracket 52 fixed to the lower portion of the upper structure 13 is bent in a correcting direction by the ball probe 56 inserted into the ball probe holder 14a. The displacement sensors 42 are attached to on surfaces twisted in a perpendicular direction in the elastic plate. The displacement sensors 42 calculate the location displacement values of the remote center compliance device.

The force-insertion force measuring sensor 40 attached to the limiter 30 calculates the force-insertion force according to an amount of the compressive deformation, and the displacement sensor 42 calculates the location displacement values. The calculated force-insertion force and location displacement values are outputted to the external display device (not shown).

Figure 11:
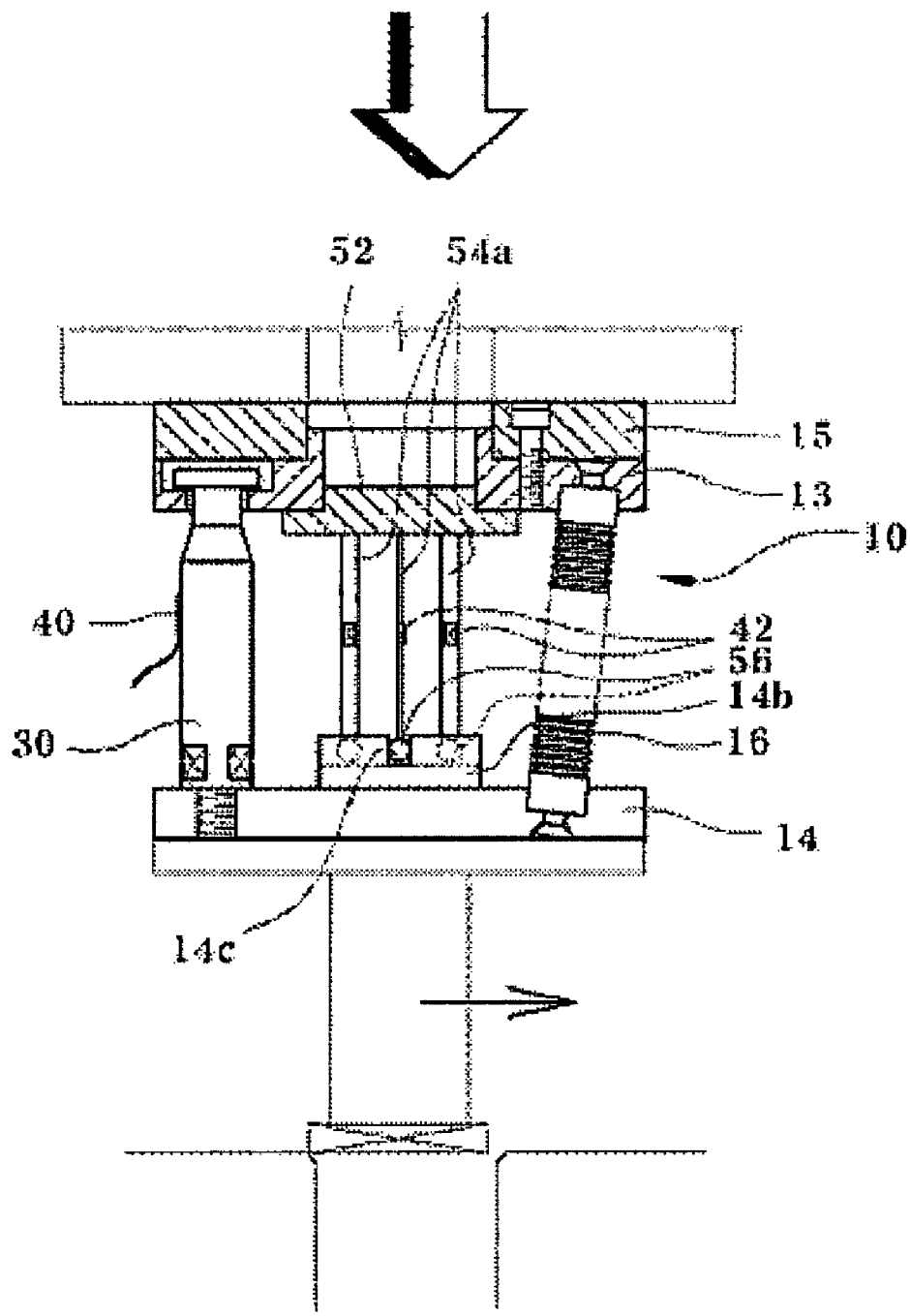
FIG. 11 is a cross-sectional view showing an assembled state of a location displacement measuring unit according to a third embodiment of the present invention.

In the location displacement measuring unit of FIG. 11, when the lower structure 14 for matching the centers of the boss and the part moves for the error correction, the location of the ball probe holder 14b fixed to the lower structure 14 and having a cross groove at an upper portion moves horizontally by a predetermined correction amount. Therefore, at least one elastic plate 54a is bent in the correcting direction by the ball probe 56 inserted into the ball probe holder. The elastic plate 54a is fixed to the displacement sensor bracket 52 fixed to a lower portion of the upper structure and is provided in X-axis and/or Y-axis directions to correspond to the cross groove 14c of the ball probe holder 14b. Since the displacement sensors are attached to the elastic plate bent in the correcting direction, the location displacement values of the remote center compliance device 10 can be calculated.

Figure 12:
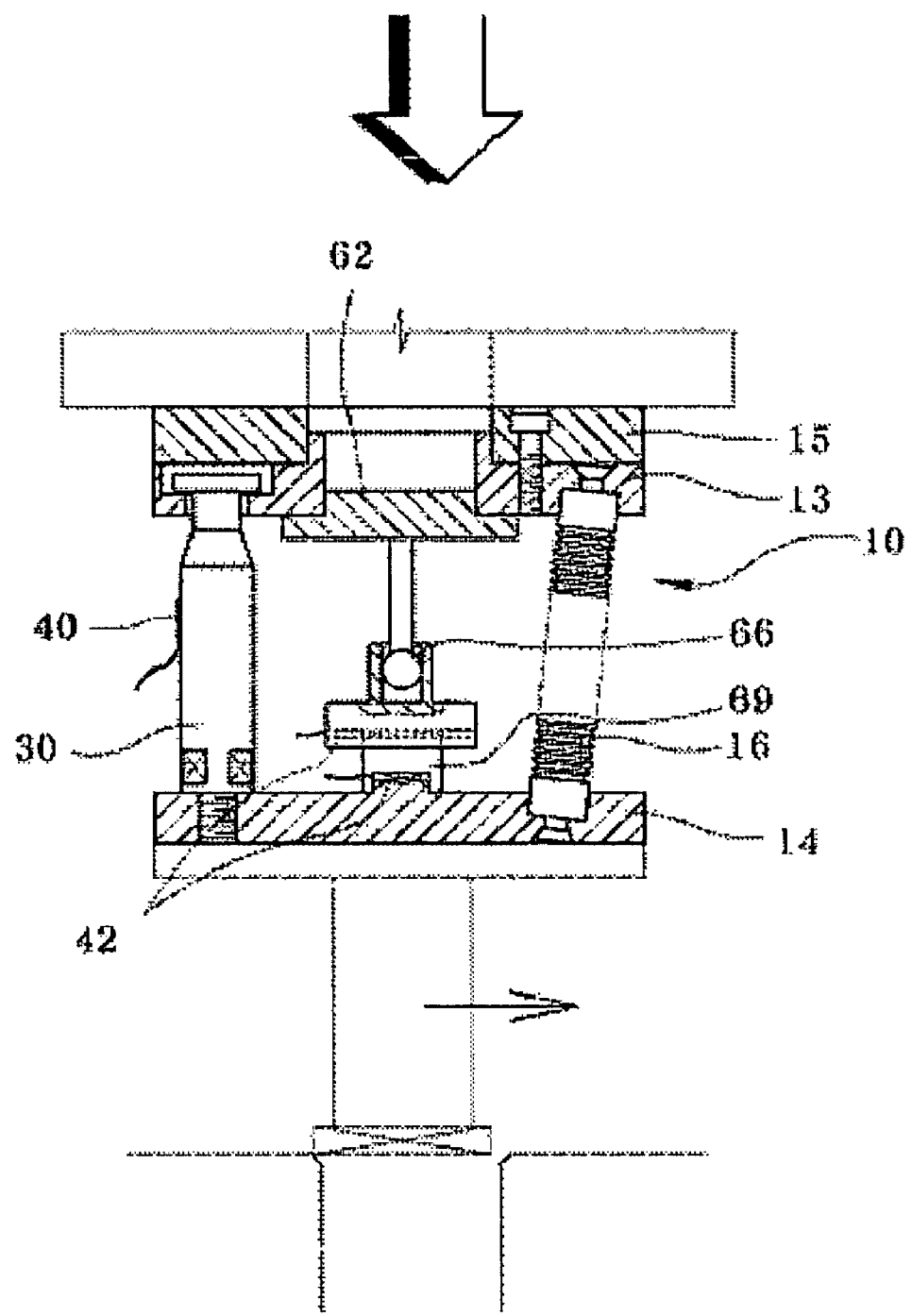
FIG. 12 is a cross-sectional view showing an assembled state of a location displacement measuring unit according to a fourth embodiment of the present invention.

FIG. 12 is a cross-sectional view of a structure that measures a correction amount of the lower structure 14 when the lower structure 14 is error-corrected so as to match the centers of the boss and the part. A ball probe 66 fixed to a lower portion of the upper structure 13 is inserted into a ball probe pocket provided above a slide-type displacement sensor 69 fixed to an upper portion of the lower structure 14. Therefore, the correction amount and direction of the lower structure 14 can be measured.

An electrical strain gage is suitable for the displacement sensor 42 illustrated in FIGS. 9 and 10, and a linear displacement sensor such as a potentiometer, a linear scale, an LVDT is suitable for the slide-type displacement sensor illustrated in FIG. 12.

According to the remote center compliance device of the present invention, the structure is so simple that its manufacturing process and cost are reduced. The center error between the boss and the part can be corrected, and the location displacement caused by the force-insertion force and error correction can be measured. Further, the remote center compliance device can be applied to the existing products.

Meanwhile, the shapes of the limiters described in other embodiments can be combined.

Moreover, a coating layer may be further formed so as to easily attach the measuring sensor to the limiter and protect the measuring sensor from external impact.

The coating layer may be formed of an elastic material, e.g., silicon, rubber, urethane, etc.

Embodiments of Measuring Block

Figure 13:
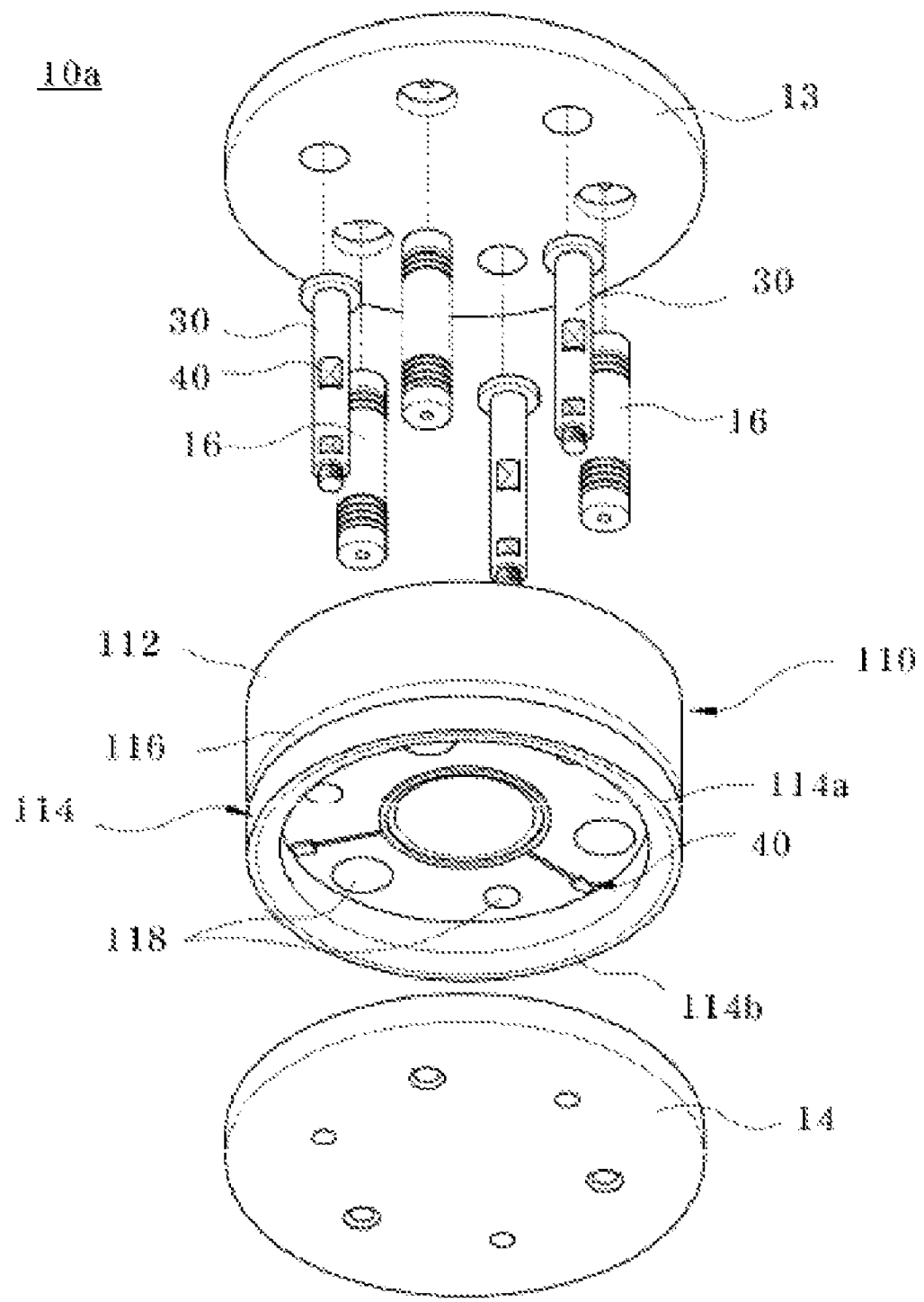
FIG. 13 is an exploded perspective view of a remote center compliance device having a measuring sensor in a measuring block according to a first embodiment of the present invention.
Figure 14:
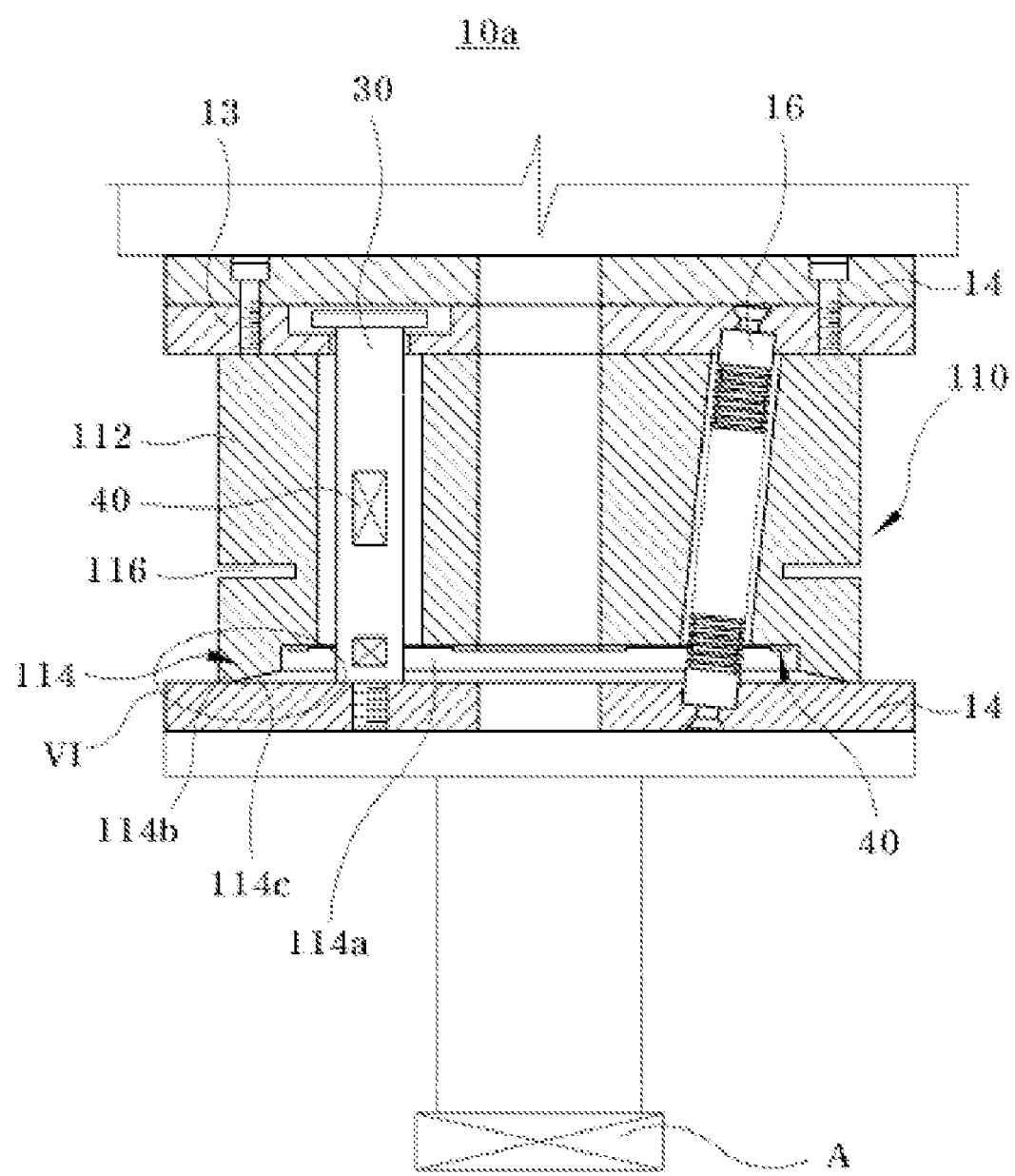
FIG. 14 is an assembled cross-sectional view of the remote center compliance device shown in FIG. 13.

FIG. 13 is an exploded perspective view of a remote center compliance device having a measuring sensor in a measuring block according to a first embodiment of the present invention, and FIG. 14 is an assembled cross-sectional view of the remote center compliance device shown in FIG. 13. In FIGS. 13 and 14, like reference numerals refer to like elements.

Referring to FIGS. 13 and 14, the remote center compliance device 10a for measuring the force-insertion force or location displacement includes upper and lower structures 13 and 14, a plurality of elastic bodies 16 disposed between the upper and lower structures 13 and 14, a measuring block 110 disposed between the upper and lower structures 13 and 14, and a force-insertion force measuring sensor 40 disposed at one side of the measuring block 110.

In addition, a plurality of limiters 30 are provided between the upper and lower structures 13 and 14 to prevent the elastic bodies 16 from being damaged by a tensile weight acting thereon.

Since the upper and lower structures 13 and 14, the elastic bodies 16, and the limiters 30 have the same structure and operational effect as those disclosed in Korean Patent Laid-open Publication No. 2001-85013 entitled "REMOTE CENTER COMPLIANCE DEVICE WITH FORCED INSERTION", filed by the present applicant, their detailed description will be omitted.

The measuring block 110 includes a fixing portion 112 fixed to the bottom of the upper structure 13 by a coupling member, and a measuring portion 114 disposed under the fixing portion 112. Preferably, the fixing portion 112 and the measuring portion 114 are integrally formed such that they are spaced apart from each other by a predetermined distance by an allowable deformation gap 116 having a predetermined depth.

In addition, the allowable deformation gap 116 changes according to a material of the measuring block 110, a thickness of the measuring portion 114, and a depth of the allowable deformation gap 116. The allowable deformation gap 116 restricts an elastic limit range when the measuring portion 114 is bent by an force-insertion repulsive force. Therefore, the measuring portion 114 is made not to exceed the elastic limit range, so that it is not deformed.

In this case, the allowable deformation gap 116 is a fine gap ranging from approximately 0.1 mm to approximately 0.2 mm.

In addition, the measuring portion 114 has a recess 114a in the center, and a protrusion 114b in a periphery of the recess 114a. A force-insertion force measuring sensor 40 is provided at the recess 114a, and the lower structure 14 and the upper structure 13 are elastically connected to each other under the protrusion 114b by the elastic bodies 16. The gap between the protrusion 114b and the lower structure 14 maintains 0.1 mm to 0.2 mm. During the force insertion, if the lower structure 14 corrects the center location error and then the elastic body 16 is primarily compressed by the force-insertion force, the gap becomes zero and the lower structure 14 is closely attached to the bottom of the protrusion 114b. Thereafter, the force-insertion force is directly applied to the measuring portion 114. The force-insertion force measuring sensor 40 measures a bending deformation amount of the measuring portion 114. Therefore, the actual force-insertion force can be calculated.

Figure 15:
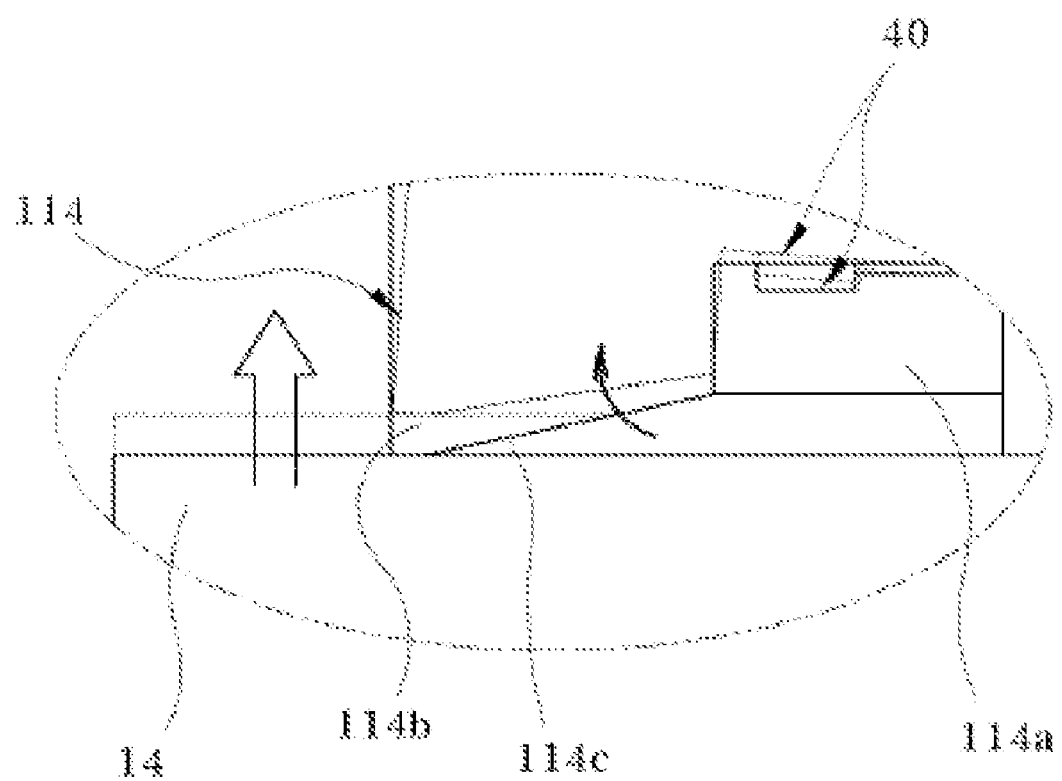
FIG. 15 is an enlarged view of a section VI of FIG. 14.

FIG. 15 is an enlarged view of a section VI of FIG. 14. Referring to FIG. 15, the protrusion 114b has a sloped surface 114c so as to minimize the attached range between the lower structure 14 and the protrusion 114b. The sloped surface 114c is formed at a slope that rises inwards to a predetermined height from the outer end of the protrusion 114b.

When the protrusion 114b is closely attached to the lower structure 14, the protrusion 114b is bent by the force-insertion repulsive force acting on the lower structure 14. However, the contact location nearest from the center, that is, the inner surface of the protrusion 114b, becomes the application point of the repulsive force.

Therefore, the sloped surface 114c is formed in order to place the application point of the repulsive force at a location farthest from the center, that is, the periphery of the protrusion 114b. Since the center radius of the application point of the force-insertion force applied to the measuring portion 114 is always constant, the force-insertion force can be correctly calculated without the bending deformation amount of the measuring portion 114.

Meanwhile, the measuring block 110 includes a plurality of elastic bodies 16 between the upper and lower structures 13 and 14, and a plurality of insertion holes 118 into which the limiters 30 are inserted. In particular, it is preferable that the insertion hole 118 for the elastic body 16 is formed so large that it does not influence the elastic deformation for the translation of the elastic body 16. As illustrated in FIGS. 9 and 10, the measuring block 110 is configured such that the displacement amount due to the location correction is easily measured and thus the force-insertion force and the location error displacement amount can be measured.

The upper structure 13 is fixed to the lifter 3 of the force-insertion apparatus, and a part fixing frame for holding the force-insertion part A is connected to the lower structure 14. Therefore, in the measuring block 110, the fixing portion is connected to the upper structure 13, and the measuring portion 110 comes in contact with the lower structure 14. The measuring block 110 can be installed upside down, regardless of locations where the force-insertion force is applied.

Preferably, a plurality of force-insertion force measuring sensors 40 are provided in X-axis and Y-axis directions in order for the correct measurement of the force-insertion force. However, the present invention is not limited to this configuration.

A method for measuring the force-insertion force or the location error correction amount will be described below with reference to FIG. 14.

The remote center compliance device is fixed to the lifter 3 of the force-insertion apparatus. The upper structure 13 is closely attached to the bottom of the lifter 3 and connected thereto by the coupling member.

The hydraulic pressure generated from the hydraulic pump of the hydraulic part 5 provided at one side of the force-insertion apparatus is transferred to the hydraulic cylinder, and the hydraulic cylinder drops the lifter 3 using a descending force The remote center compliance device 10a is fixed to the bottom of the lifter 3, and the part fixing frame is provided under the remote center compliance device 10a to fix the part A to be force-inserted into the boss B. The part A is force-inserted into the boss B by the descending part fixing frame.

At this point, when the center error occurs between the boss B and the part A, the force insertion is smoothly performed by the center error correction between the boss B and the part A. In addition, the force-insertion force is generated by the force insertion of the boss B and the part A.

The force-insertion repulsive force is transferred to the lower structure 14 through the part fixing frame. The repulsive force acting on the lower structure 14 is applied to the measuring portion 114 of the measuring block 110 closely attached to the top of the lower structure 14. Therefore, the measuring portion 114 is finely bent.

Therefore, the force-insertion force measuring sensor 40 provided in the recess 114a of the measuring portion 114 detects the deformation due to the fine bending and outputs the deformation rate on the external display device. Hence, the operator can determine if the boss B and the part A are force-inserted within the allowable error range.

In addition, the location error correction amount can be measured. The displacement measuring unit of FIG. 8 may be installed in the upper structure around the head of the limiter 30, or between the upper structure 13 and the lower structure 14 as illustrated in FIGS. 9 to 12. When the center error between the boss B and the part A is corrected by the remote center compliance device 10a, the location of the ball probe holder 14a fixed to the lower structure 14 moves horizontally by the correction amount. Therefore, the elastic plate 54 fixed vertically to the displacement sensor bracket 52 fixed to the lower portion of the upper structure 13 is bent in the correction direction by the ball probe 56 inserted into the ball probe holder 14a. The displacement sensors 42 are attached to the surface distorted in a perpendicular direction. Hence, the location error correction amount can be calculated by measuring the bending deformation amount of the elastic plate bent in the correction direction.

Therefore, when the force-insertion force measured by the force-insertion force measuring sensor 40 of the measuring block 110 exceeds or does not reach the error range, the force-insertion failure/success can be determined by an automatic sensing. If using the displacement sensor 42 attached to the elastic plate or the slide-type displacement sensor (not shown), the current location error correction amount can be checked in each force insertion. Consequently, the production lines can be more efficiently measured.

When the part A is completely force-inserted into the boss B, the lifter 3 ascends by the rising hydraulic pressure of the hydraulic part 5. In this way, the force insertion is finished.

The remote center compliance device with the measuring sensor for measuring the force-insertion force or the location error correction amount corrects the center error of the boss and the part and measures the force-insertion force. Thus, the location error of the boss B and the force-insertion error can be measured. The production lines can be monitored in real time by outputting the location error correction values on the external display device (not shown), and the force-insertion quality can be managed thoroughly.

The conventional force-insertion apparatus uses the expensive LM guide for the precise rise of the lifter. However, according to the present invention, the use of the LM guide can be selected and thus the manufacturing cost of the force-insertion apparatus can be minimized, thereby improving the product competitiveness.

Figure 16:
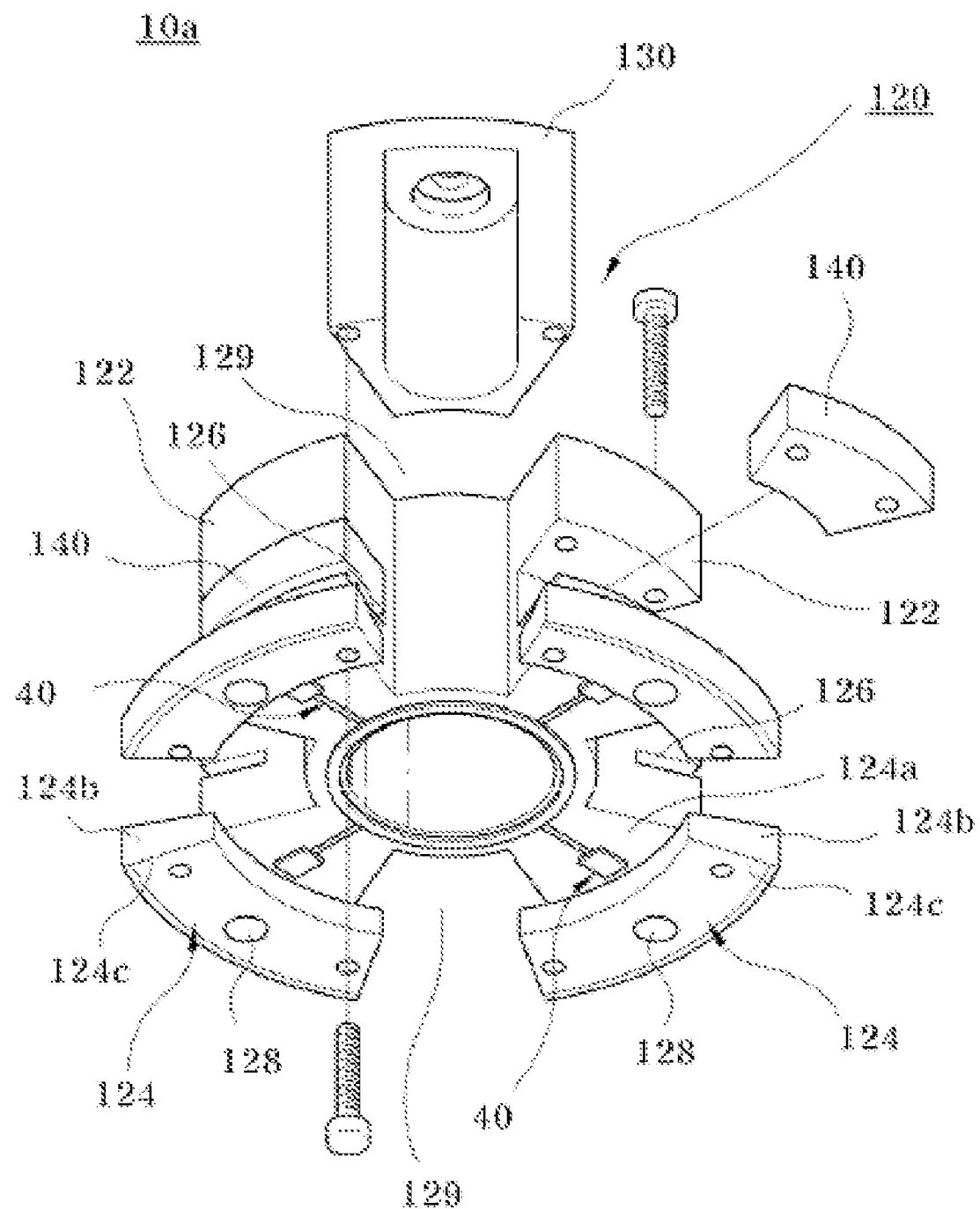
FIG. 16 is a partial exploded perspective view of a measuring block according to a second embodiment of the present invention.
Figure 17:
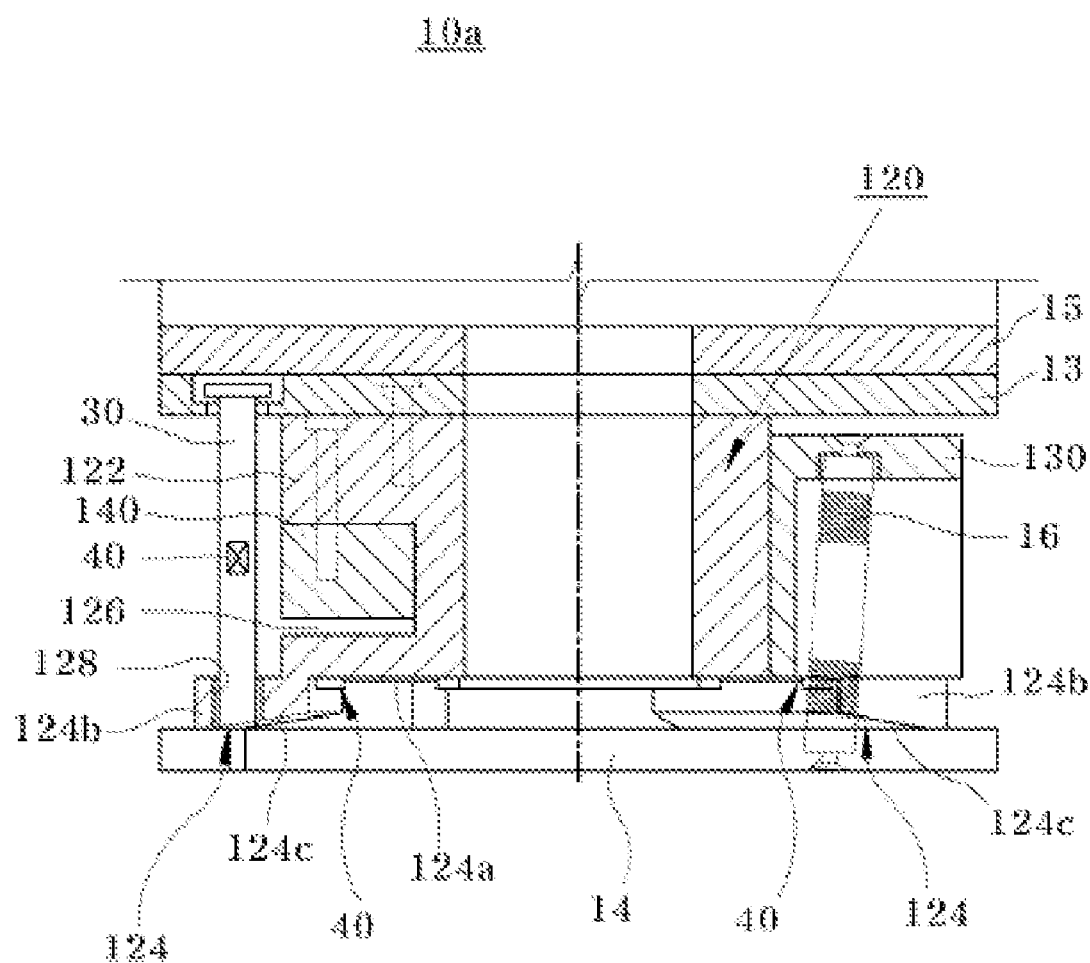
FIG. 17 is a cut-away cross-sectional view of the measuring block of FIG. 16, based on a complex cutting method.
Figure 18:
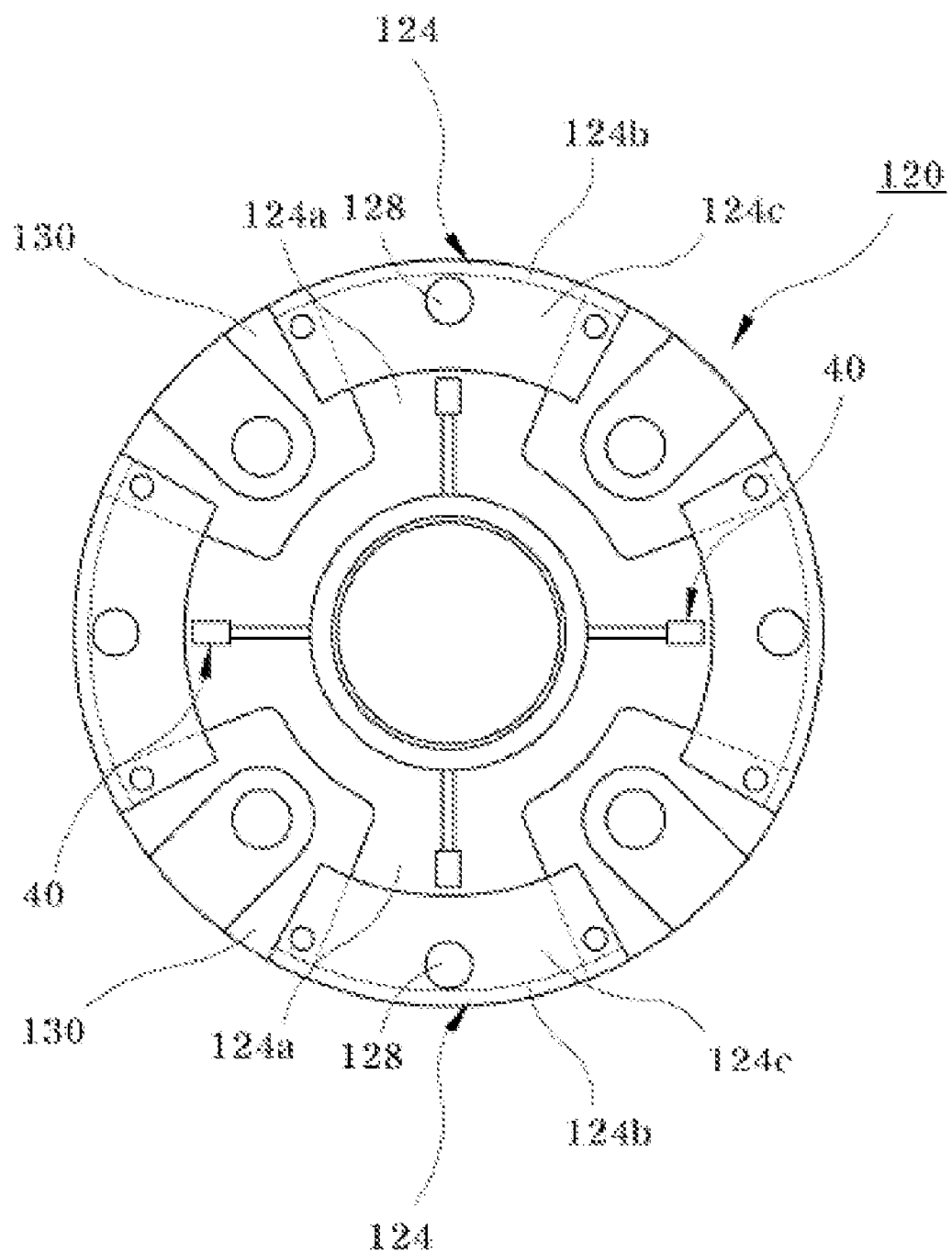
FIG. 18 is an assembled bottom view of a measuring block according to a second embodiment of the present invention.

FIG. 16 is a partial exploded perspective view of a measuring block according to a second embodiment of the present invention, and FIG. 17 is a cut-away cross-sectional view of the measuring block of FIG. 16, based on a complex cutting method. Referring to FIGS. 16 and 17, the measuring block 120 according to the second embodiment of the present invention includes a fixing portion 122 fixed to the bottom of the upper structure 13, and a measuring portion 124 provided under the fixing portion 122. An allowable deformation gap 126 is defined to maintain the gap between the fixing portion 122 and the measuring portion 124. The fixing portion 122 and the measuring portion 124 define a plurality of mount spaces 129 where the elastic bodies 16 are seated. An auxiliary block 130 is provided in the mount spaces 129 to support the elastic bodies 16.

In addition, the measuring portion 124 has a recess 124a in the center, and a protrusion 124b in a periphery of the recess 124a. The protrusion 124b is cut into a plurality of unit pieces at regular intervals in the region where the mount spaces 129 are formed.

The unit pieces of the protrusion 124b have coupling holes into which the coupling member is inserted so as to couple the auxiliary block 130, and an insertion hole 128 for the limiter 30 is formed in the center of the protrusion 124b.

In addition, a sloped surface 124c is formed in a bottom of the protrusion 124b so as to minimize the contact area with the bottom structure 14. The sloped surface 124c has a slope rising from an outer side to an inner side by a predetermined angle. The sloped surface 124c has the same operational effect as that of the first embodiment.

Meanwhile, the force-insertion force measuring sensor 40 provided in the recess 124a is implemented with an electrical strain gage. A plurality of electrical strain gages are provided in X-axis and Y-axis directions. However, the present invention is not limited to this configuration. The plurality of electrical strain gages can measure the force-insertion force more correctly.

The allowable deformation gap 126 prevents the measuring portion 124 from exceeding the elastic limit and being deformed. Generally, the allowable deformation gap 126 ranges from 0.1 mm to 0.2 mm. However, it is difficult to process the allowable deformation gap 126. To solve this problem, the space is formed by processing a predetermined portion of the allowable deformation gap region.

In addition, the fixing block 140 is placed in the above space, and the allowable deformation gap 126 is formed by the height difference between the fixing block 140 and the processed space.

The auxiliary block 130 has a space where the elastic bodies 16 are fixed. A lower portion of the auxiliary block 130 is coupled between the unit pieces formed in the protrusion 124b by a coupling member.

Preferably, an upper portion of the auxiliary block 130 is lower than the fixing portion 122. The reason for this is that the bending deformation of the protrusion 124b is interrupted when the lower portion of the upper structure 13, to which the fixing portion 122 is fixed, is closely contacted with the upper surface of the auxiliary block 130.

A measuring method using the measuring block according to a second embodiment of the present invention is identical to that according to the first embodiment of the present invention. A method for measuring the force-insertion force and the location displacement is identical to that according to the first embodiment of the present invention. Therefore, their detailed description will be omitted.

Figure 19:
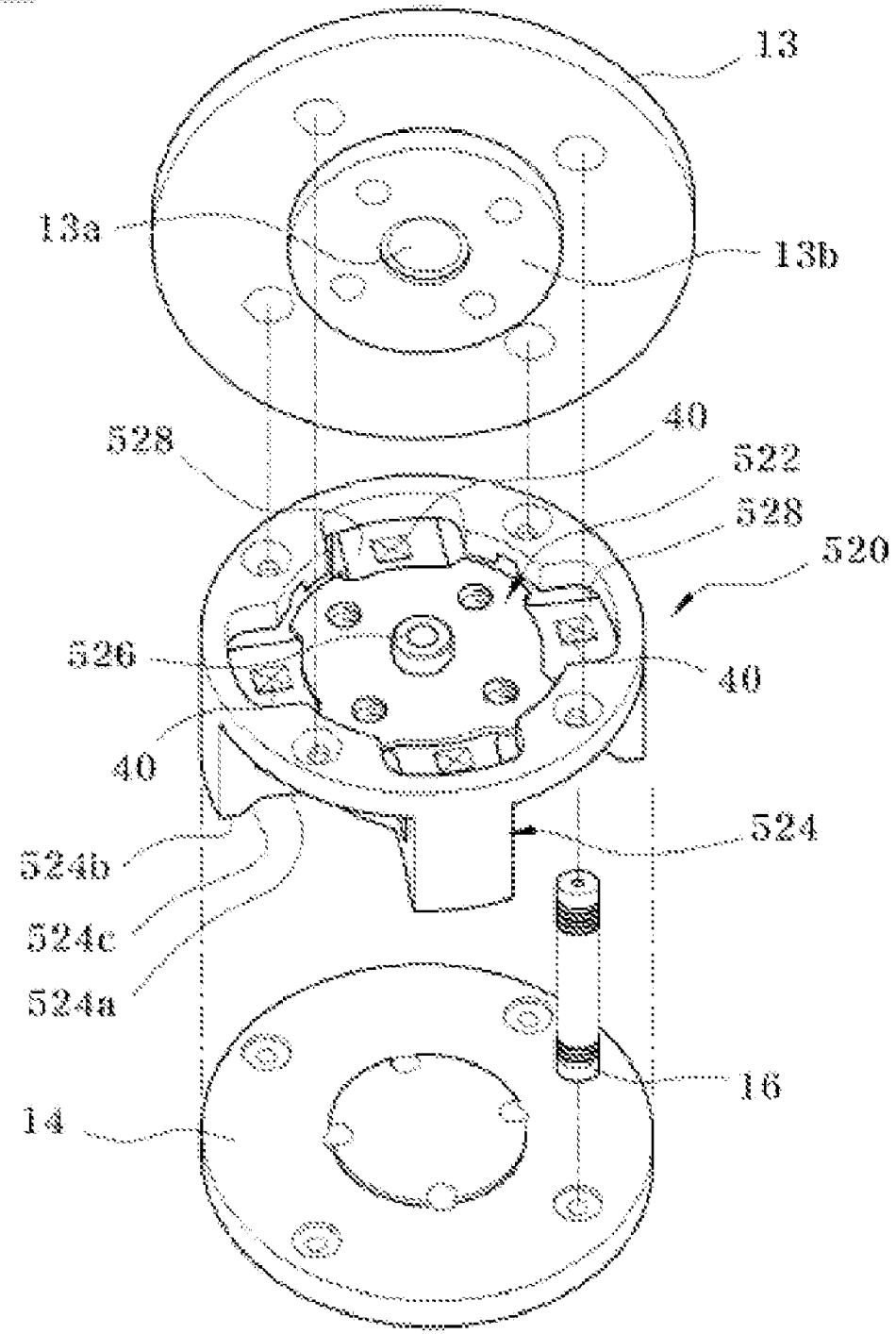
FIG. 19 is a partial exploded perspective view of a measuring block according to a third embodiment of the present invention.
Figure 20:
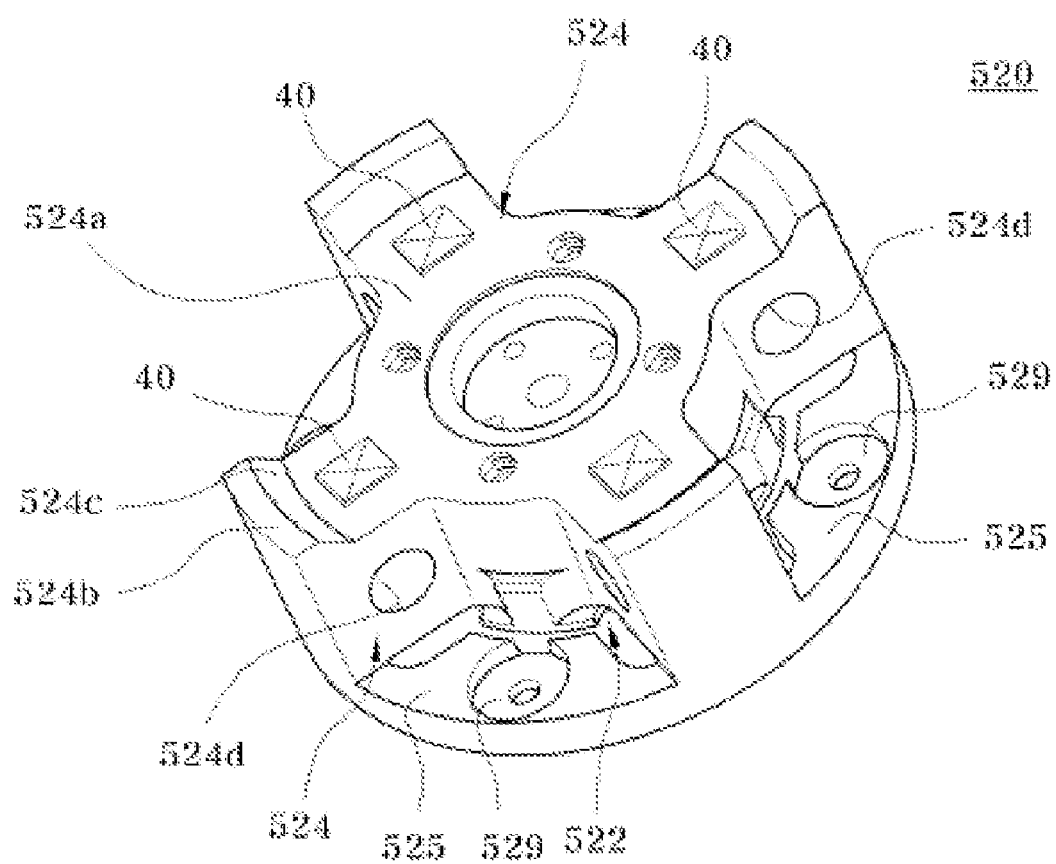
FIG. 20 is a bottom perspective view of the measuring block according to the third embodiment of the present invention.
Figure 21:
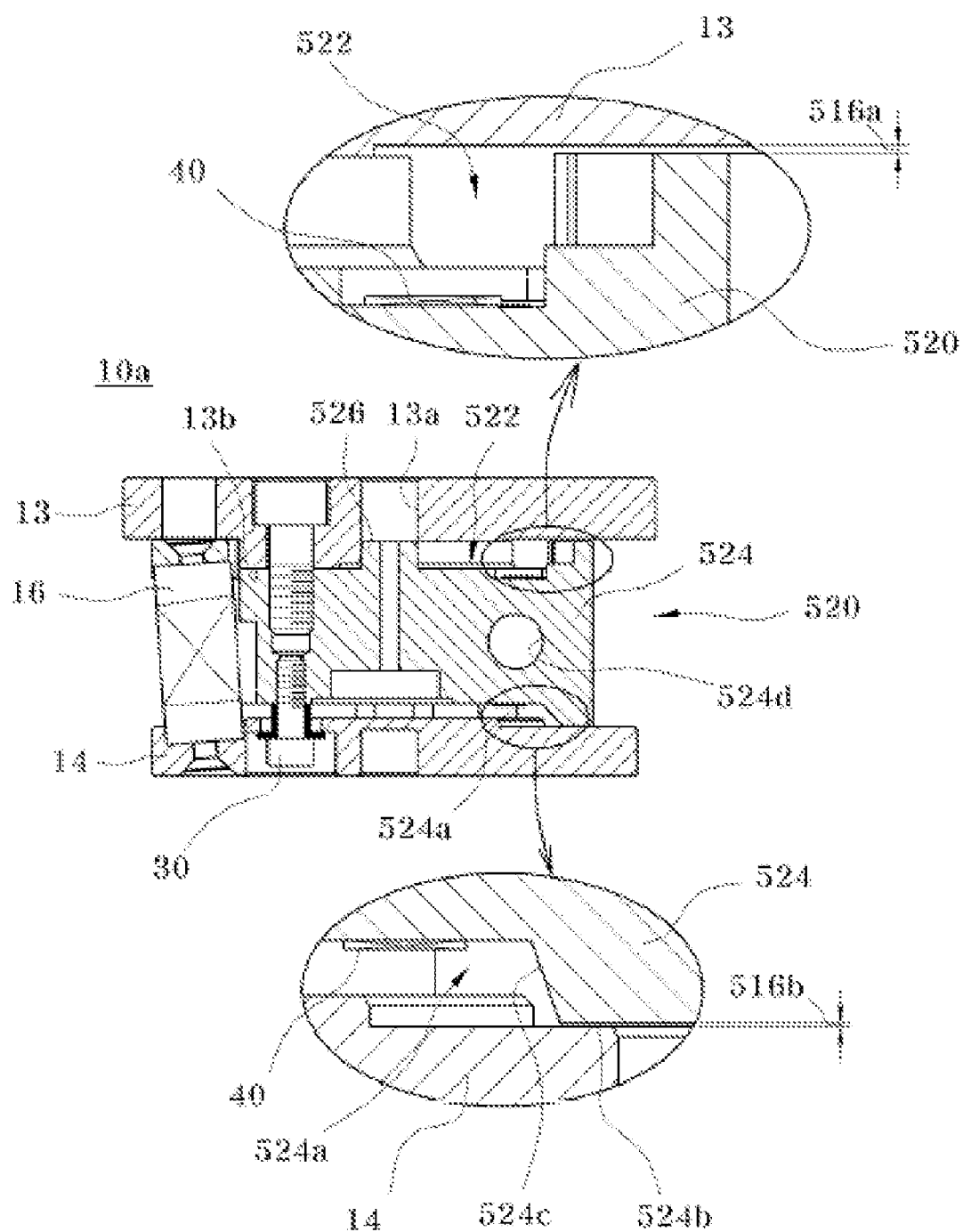
FIG. 21 is a cross-sectional view of the measuring block of FIG. 19, based on a complex cutting method.

FIG. 19 is a partial exploded perspective view of a measuring block according to a third embodiment of the present invention, FIG. 20 is a bottom perspective view of the measuring block according to the third embodiment of the present invention, and FIG. 21 is a cross-sectional view of the measuring block of FIG. 20, based on a complex cutting method.

Referring to FIGS. 19 and 20, the measuring block 520 includes a fixing portion 522 and a cross-shaped measuring portion 524. The fixing portion 522 is fixed to the protruding bottom surface 13b of the upper structure 13. The measuring portion 524 is provided under the fixing portion 522.

The fixing portion 522 is recessed in a cross shape to a predetermined depth. A coupling protrusion 526 protrudes from the center of the fixing portion 522. The fixing portion 522 is tightly connected to the protruding bottom surface 13b of the upper structure 13 having a coupling hole 13a in the center. A recessed surface 528 is formed in the fixing portion 522 in the direction of the measuring portion 524. A measuring sensor 40 is attached to the recessed surface 528 to measure the bending deformation amount of the measuring portion 524.

The measuring portion 524 forming the cross shape is formed under the fixing portion 522. At least one force-insertion force measuring sensor 40 is provided in the recess 524a. A protrusion 524b is formed around the periphery of the recess 524a. A connecting portion 525 connects the cross-shaped measuring portions 524, and a mount space 529 is formed at one side of the connecting portion 525. One end of the elastic body 16 is inserted into the mount space 529.

In addition, the cross-shaped measuring portion 524 has a penetration hole 524d in the center to adjust the bending deformation amount of the measuring portion 524.

As illustrated in FIG. 21, the measuring portion 524 and the fixing portion 522 have a plurality of coupling holes and a plurality of screw holes, so that the upper structure 13, the measuring block 520, and the bottom structure 14 are mutually connected by the limiter 30 or the elastic body 16 and the fixing member. In this way, the remote center compliance device 10a is configured to measure the force-insertion force using the measuring block 520.

More preferably, the elastic body 16 is fixed by the mount hole 529 of the connecting portion 525 and the mount hole 529 of the lower structure 14 connecting the cross-shaped measuring portions 524.

In addition, the coupling protrusion 526 of the fixing portion 522 is connected to the coupling hole 13a of the upper structure 13, and the upper structure 13 and the fixing portion 522 are fixed by a fixing member.

Preferably, the measuring portion 524 and the lower structure 14 are connected by the limiter 30.

As the protrusion bottom surface of the upper structure 13 and the fixing portion 522 are fixed together, a fine allowable deformation gap 516a occurs between the outer upper surface of the fixing portion 522 and the upper structure 13, and a fine allowable deformation gap 516b occurs between the lower structure 14 and the protrusion 524b of the measuring portion 524. Therefore, the lower structure 14 can smoothly correct the location error.

The allowable deformation gap 516a prevents the measuring portion 54 from exceeding the elastic limit and being deformed. Generally, the allowable deformation gap 516a ranges from 0.1 mm to 0.2 mm.

The operation and effect of the measuring block according to the third embodiment of the present invention will be described below with reference to FIG. 21.

Detailed description of the force-insertion process having already described in the first and second embodiments of the present invention will be omitted.

In the measuring block provided between the upper structure 13 and the lower structure 14, the protrusion 524b and the sloped surface 524c provided in a lower portion of the measuring portion 524 are deformed by the force-insertion force acting between the upper structure 13 and the lower structure 14. The force-insertion force measuring sensor 40 provided in the recess 524a of the measuring portion 524 measures the bending deformation amount of the recess 524a. Since this is identical to the operation of the measuring sensor 40 according to the first and second embodiments of the present invention, its detailed description will be omitted.

The fixing portion 522 is fixed to the bottom protrusion 13b of the upper structure 13, and the central coupling protrusion 526 is fixed to the coupling hole 13a by a fixing member (not shown). The measuring sensor 40 is provided in the recessed surface 528 of the fixing portion 522. Due to the bending of the measuring portion 524, the recessed surface 528 formed on the upper surface of the measuring portion 524 is deformed. The measuring sensor 40 provided in the recessed surface 528 measures the deformation. Since this is identical to the operation of the measuring sensor 40 according to the first and second embodiments of the present invention, its detailed description will be omitted.

The buffering operation and deformation of the measuring block 520 are easily performed by the penetration hole 524d provided in the center of the cross-shaped measuring portion 524. Therefore, the force-insertion force is more correctly measured.

When the force-insertion force is generated by the force-insertion process, the initial force-insertion force can be measured by the fixing portion 522 contacting the upper and lower structures 13 and 14 and the recessed portion 524a of the cross-shaped measuring portion 524. Therefore, the force-insertion force can be precisely measured.

Preferably, the measuring senor may be selectively provided in the fixing portion and/or the cross-shaped measuring portion according to the user's convenience.

Embodiments of Elastic Body

Figure 22:
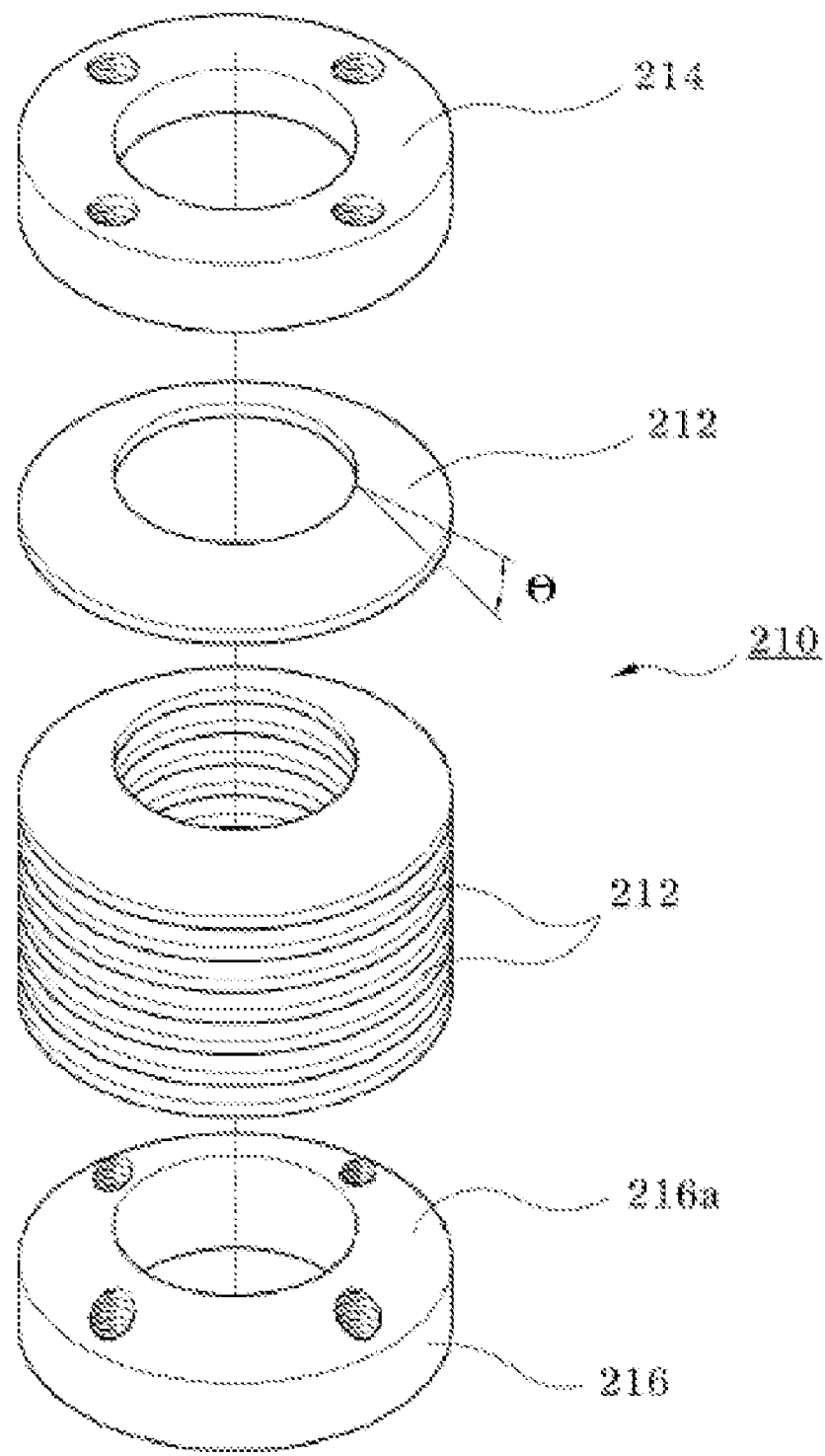
FIG. 22 is a partial exploded perspective view of an elastic body according to a first embodiment of the present invention.
Figure 23:
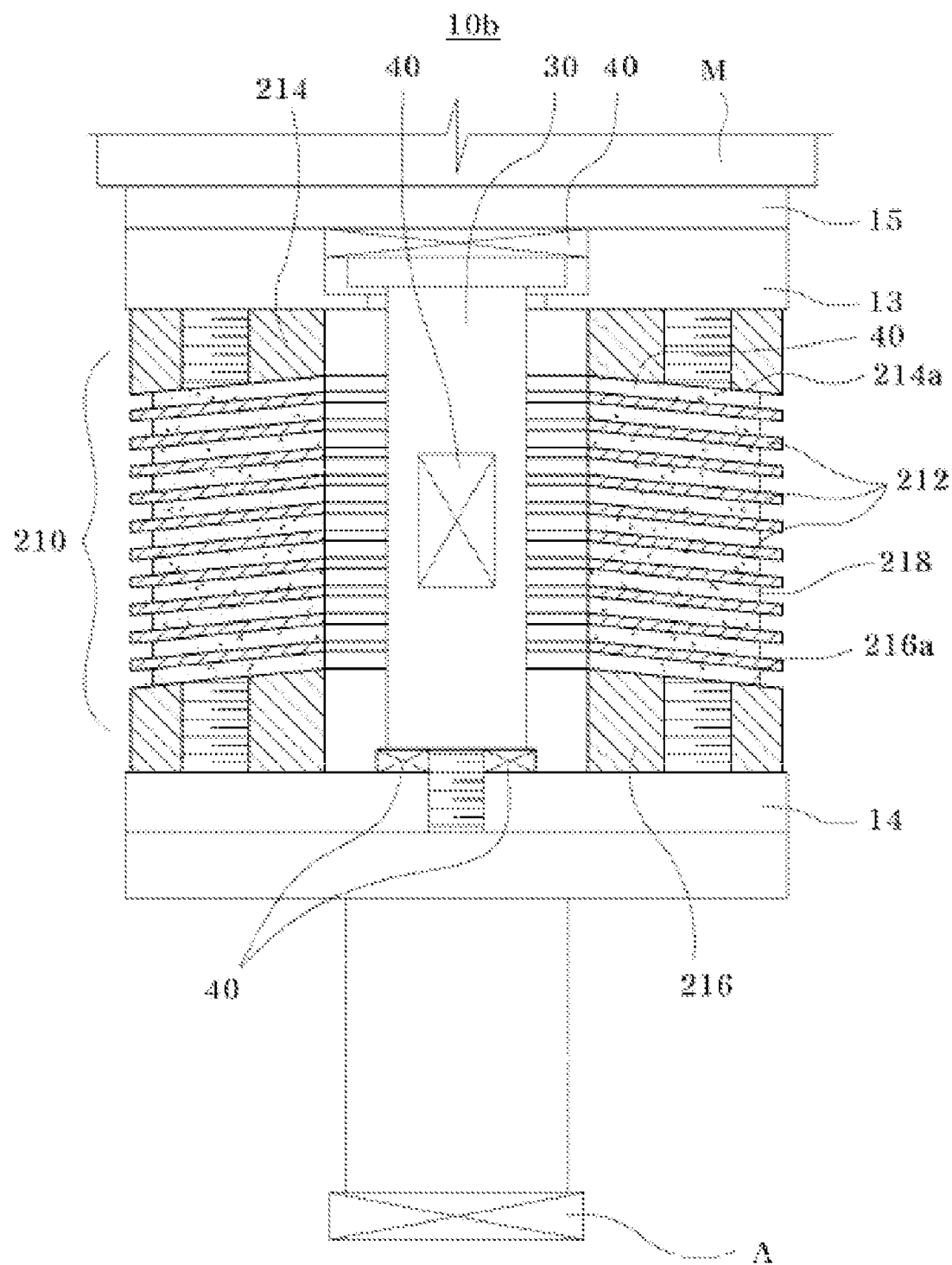
FIG. 23 is a cross-sectional view illustrating a state that a limiter with a measuring sensor is assembled with the elastic body according to the first embodiment of the present invention.

FIG. 22 is a partial exploded perspective view of an elastic body according to a first embodiment of the present invention, and FIG. 23 is a cross-sectional view illustrating a state that a limiter with a measuring sensor is assembled with the elastic body according to the first embodiment of the present invention. Referring to FIGS. 22 and 23, the elastic body 210 includes a plurality of disks 212 stacked at constant intervals, first and second supports 214 and 216 provided on both sides of the disks 212 and spaced apart from one another, and a filler 218 filled between the first and second supports 214 and 216 and the disks 212 to elastically connect them.

The disk 212 has a through hole in the center and has an outer periphery inclined with a predetermined slope ($\theta$). Preferably, the slope ($\theta$) ranges from 2° to 15°. The location of the elastic center point P disclosed in Korean Patent Laid-open Publication No. 2001-85013 is changed according to the angle of the slope ($\theta$). Therefore, the location of the elastic center point P is approximately selected.

When it is assumed that the elastic center point is located at a lower portion, the slope direction of the disk 212 is directed downward from an inner side to an outer side, that is, in a crossing direction of straight lines with respect to the slope.

In addition, the measuring sensor 40 is attached to the bottom of an upper cover 15 and measures the force-insertion force transferred to the limiter 30. As illustrated in FIG. 7A, the measuring sensor 40 may be fixedly inserted between the limiter 30 and the lower structure 14.

The first and second supports 214 and 216 have the same slope ($\theta$) on both sides of the disks 212 and are spaced apart from each other by a predetermined distance. As illustrated in FIG. 22, the recessed portion 214a is formed in the first support 214, and the protrusion 216a is formed in the second support 216.

A plurality of coupling holes are formed in the first and second supports 214 and 216 and couple the respective parts or devices.

The filler 218 is formed of a rubber having an excellent elastic force. However, the present invention is not limited to the rubber. In some cases, a synthetic resin having an excellent elastic force can be used as the filler 218.

The displacement sensor 42 provided on the limiter of FIG. 8 to measure the horizontal displacement is arranged in the upper structure 13 adjacent to the head of the limiter in an intersecting direction. Therefore, the location error correction amount is measured in real time and outputted on the external display device.

The location displacement measuring unit of FIGS. 9 to 12 can be installed in the location where the limiter 30 has been disposed. In addition, by installing the location displacement measuring unit in the outside of the elastic body 210, the location error correction amount can be measured in real time.

The operation of the remote center compliance device having one elastic body to measure the force-insertion force or the location error correction amount will be described below.

The first support 214 is fixed to the bottom of the upper structure 13 connected to the upper cover 15 by the coupling member, and the second structure 216 is fixed to the lower structure 14 having a force-insertion frame holding the force-insertion part A.

The elastic body 210 falls down by the descending force of the lifter M and inserts the part A into the boss B forcibly. When a center error exists between the boss B and the part A, the part A can be easily force-inserted into the boss B by matching the part A and the boss B with respect to the central axis by the translation based on the elastic center principle of the elastic body 210.

The force-insertion force is transferred to the force-insertion force measuring sensor 40 installed in the sidewall, upper portion or lower portion of the limiter 30, and the force-insertion force applied to the remote center compliance device 10b is measured. At this point, it is preferable that a load cell is used as the force-insertion force measuring sensor 40 installed in the upper or lower portion of the limiter 30.

As illustrated in FIG. 8, the displacement sensor 42 is provided to measure the displacement amount of the upper portion of the limiter 30. Therefore, the location error correction amount can be more correctly measured.

The measured force-insertion force or location error correction amount is outputted to the external display device (not shown) and can be used to manage the force-insertion quality or used as a control signal of a production line.

In addition, the elastic center point of the elastic body 210 is changed according to the slope ($\theta$) of the disk 212, the number of the disk 212, and the distance, and can be differently set according to the devices using the elastic body 210.

Therefore, the elastic body 210 minimizes the cumulative error of the plurality of elastic bodies, which is the problem of the conventional remote center compliance device, and thus the elastic center point due to the elastic body 210 can be easily adjusted. The force-insertion force measuring sensor 40 provided in the limiter 30 or the force-insertion force measuring sensor 40 separately provided under the top cover 15 disposed above the limiter calculates the force-insertion force, and the displacement sensor 42 calculates the location error correction value. The calculated force-insertion force and location displacement values are outputted on the external display device (not shown).

As the number of parts is considerably decreased by the single elastic body, the manufacturing process and cost are significantly reduced. In addition, the reduction of the installation space improves the space utilization, thereby increasing the product competitiveness.

Figure 24:
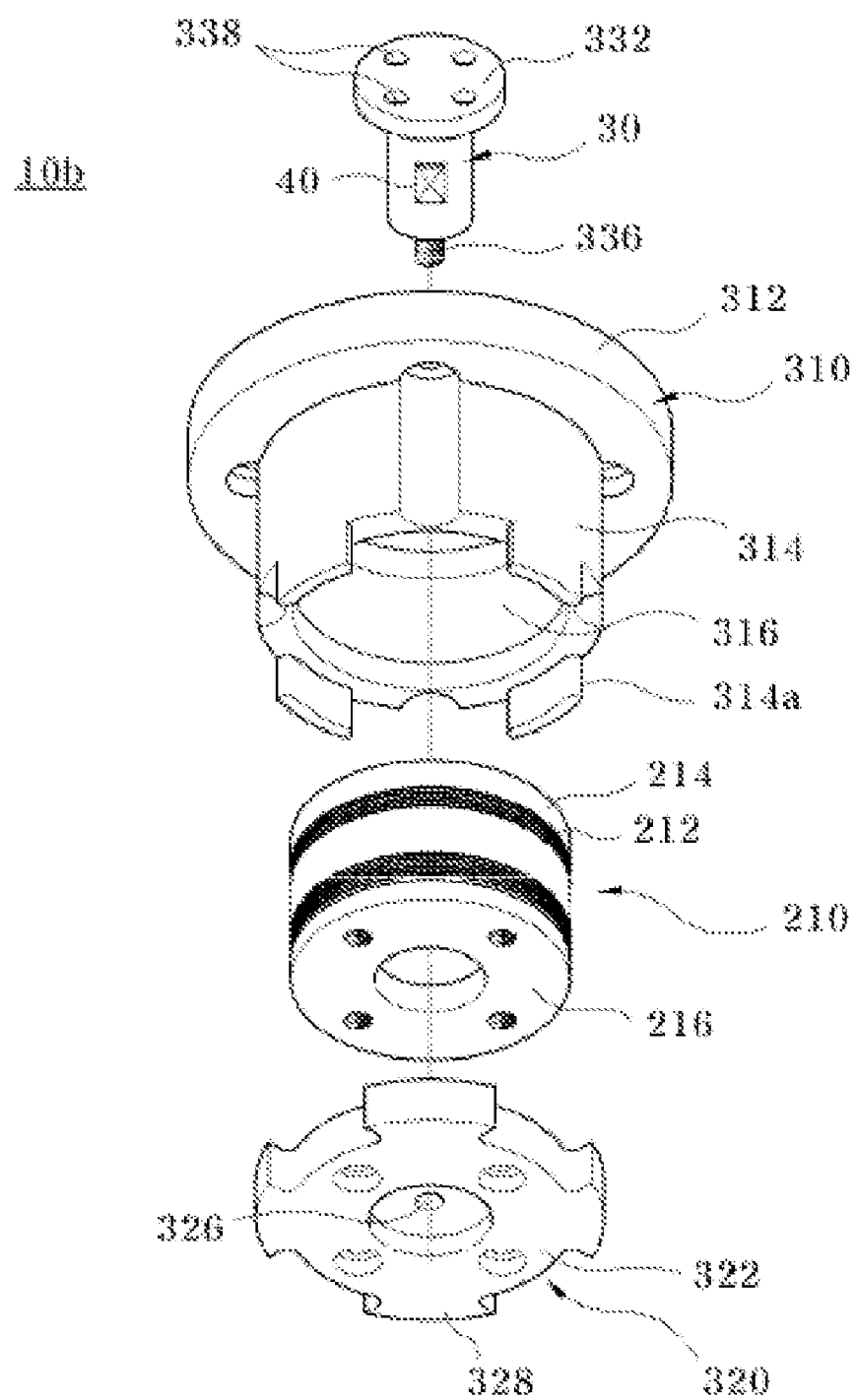
FIG. 24 is an exploded perspective view of a remote center compliance device according to a second embodiment of the present invention.
Figure 25:
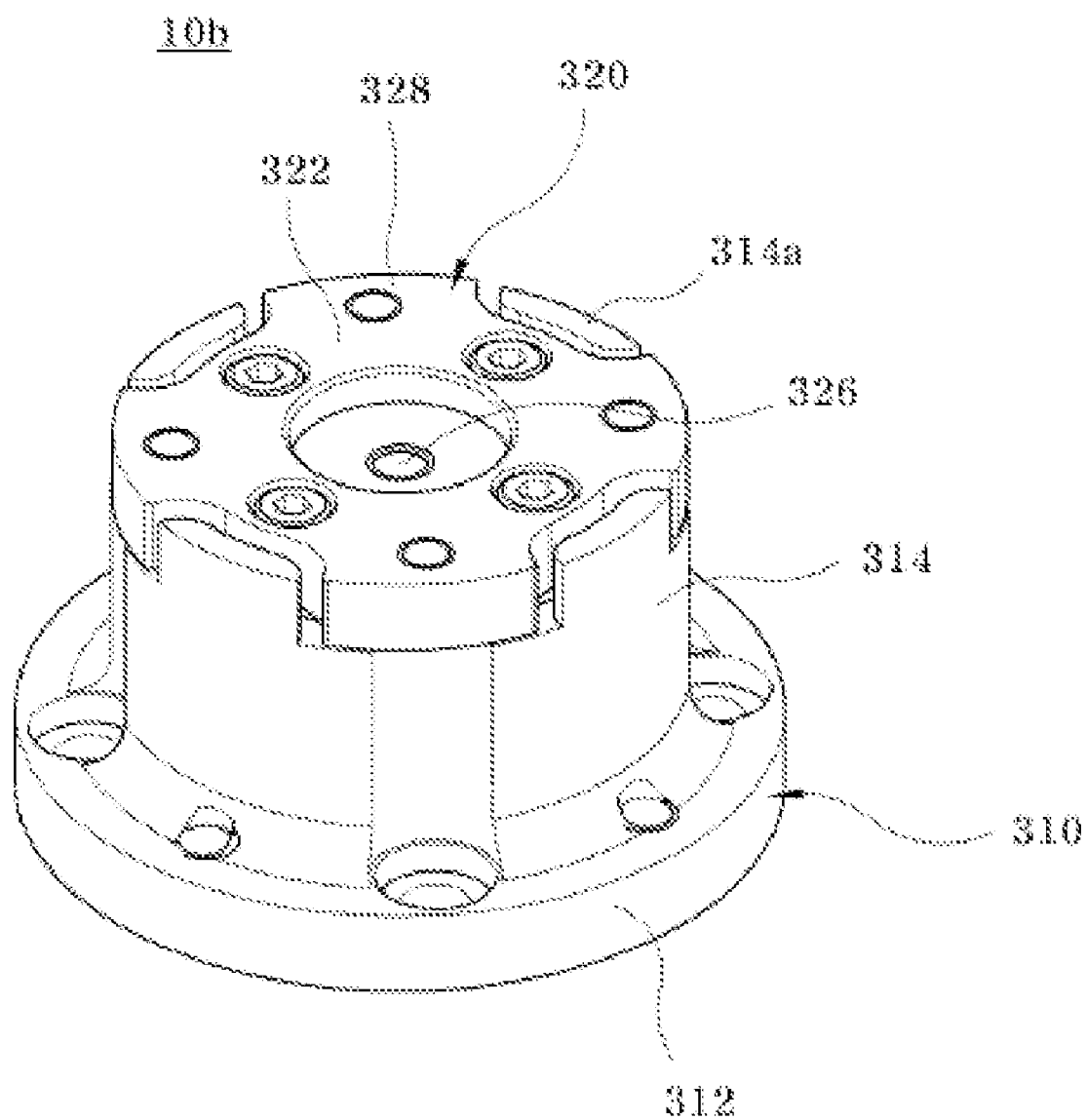
FIG. 25 is a bottom perspective view illustrating the assembled state of FIG. 24.
Figure 26:
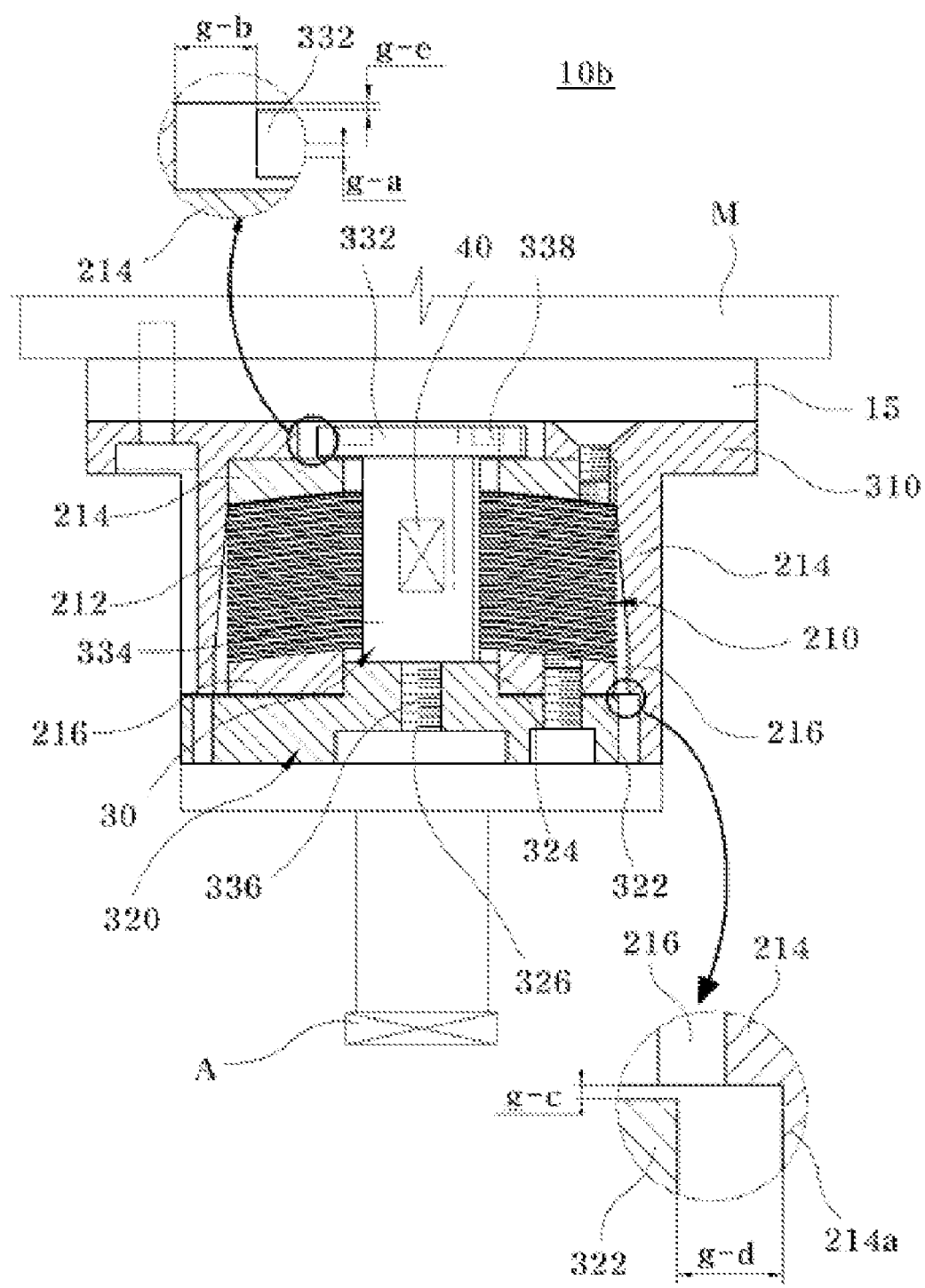
FIG. 26 is an assembled cross-sectional view of the remote center compliance device shown in FIG. 24.

FIG. 24 is an exploded perspective view of a remote center compliance device according to a second embodiment of the present invention, FIG. 25 is a bottom perspective view illustrating the assembled state of FIG. 24, and FIG. 26 is an assembled cross-sectional view of the remote center compliance device shown in FIG. 24. Referring to FIGS. 24 to 26, the remote center compliance device includes an elastic body 210, upper and lower structures 310 and 320 fixed to upper and lower portions of the elastic body 210, and a limiter 30 provided between the upper and lower structures 310 and 320.

Since the elastic body 210 has the same structure as that of the first embodiment of the present invention, its detailed description will be omitted.

The upper structure 310 includes an upper portion 312 and a flange 314. The upper portion 312 of the upper structure 310 has a plurality of coupling holes, and the flange 314 extends downward from the upper portion 312. A receiving space 316 where the elastic body 210 is received is formed inside the flange 314. A through hole (not shown) is formed to communicate with the receiving space 316 in the upper portion 312.

In addition, the upper portion of the elastic body 210 is coupled to the upper portion of the receiving space 316 by a coupling member, and the elastic body 210 is formed so large that the translation range is not interfered.

Protrusions 314a are formed radially under the flange 314 at constant intervals and define insertion spaces recessed to a predetermined depth.

The lower structure 320 includes a lower portion 322 and a protrusion 324. The protrusion 324 protrudes upward from the center and has a coupling hole 326 in the center. In addition, a plurality of coupling holes are formed in the lower portion 322 and are connected to a coupling member for fixing the lower portion of the elastic body 210.

Rotation preventing members 328 are formed radially at constant intervals around the periphery of the lower portion 322 of the lower structure 320. The rotation preventing members 328 are inserted into the insertion spaces of the protrusions 314a formed in the lower portion of the upper structure 310.

Preferably, the limiter 30 includes a head 332, a shaft 334 extending downward from the head 332, a force-insertion force measuring sensor 40 disposed at one side of the shaft 334, a male screw 336 disposed at a lower portion of the shaft 334.

More preferably, the male screw 336 of the limiter 30 is coupled to the coupling hole 326 of the lower structure 320. A plurality of wrench grooves 338 are formed at the head 332 to release or lock the limiter 30.

An assembly relationship of the remote center compliance device will be described below.

The elastic body 210 is inserted into the receiving space 316 of the upper structure 310 and the inner upper portion of the receiving space 316 is closely attached to the upper portion of the elastic body 210, and they are coupled by the coupling member.

The lower structure 320 is disposed under the upper structure 310, and the coupling members are coupled through the coupling holes formed in the lower portion 322 of the lower structure 320. The lower portion of the elastic body 210 fixed to the upper structure 310 is coupled and fixed.

Referring to FIG. 26, a predetermined gap is formed between the insertion spaces of the protrusion 314a and the rotation preventing members 328 in such a state that the rotation preventing members 328 are inserted into the insertion spaces of the protrusion 314.

In addition, in such a state that the upper and lower structures 310 and 320 are assembled, the limiter 30 is inserted through the through hole 318 and the male screw 336 of the limiter 30 is coupled to the coupling hole 326 of the lower structure 320. Therefore, the limiter 30 is assembled vertically in the center of the upper and lower structures 310 and 320.

It is preferable that a predetermined assembly gap is formed during the assembly of the upper and lower structures 310 and 320 and the limiter 30. When the elastic body 210 conducts the translation movement based on the elastic center principle, the upper and lower structures 310 and 320 and the limiter 30 are smoothly moved.

Referring to FIG. 26, the assembly gap of the upper and lower structures 310 and 320 and the limiter 30 includes an allowable tension gap (g-a) between the upper portion of the elastic body 210 and the lower portion of the head 332 of the limiter 30, an allowable compression gap (g-e) between the lower surface of the through hole 318 of the upper structure 310, and the allowable translation gap (g-d) caused by difference between an inner diameter of the protrusion 314a of the flange 314 and an outer diameter of the lower structure 320.

In addition, the assembly gap includes an allowable compression gap (g-c) between an end of the flange 314 and the upper surface of the lower structure 320, and a translation gap (g-d) caused by difference between an inner diameter of the protrusion 314a of the flange 314 and an outer diameter of the lower structure 320.

The tension and compression gaps (g-a, g-c, g-e) form a gap so as to make the translation movement possible during the translation movement of the elastic body 210. In addition, the elastic body 210 is prevented from being buckled or damaged by preventing the tensile force caused by the weight or the compression force caused by the force insertion from continuously acting on the elastic body 210.

Preferably, the tension or compression gaps (g-a, g-c, g-e) range from 0.1 mm to 0.2 mm.

When the elastic body 210 conducts the translation movement based on the elastic center principle, the translation gaps (g-b, g-d) are formed such that the translation movement of the limiter 30 and the lower structure 320 does not interfere the upper structure 310.

In such a remote center compliance device, the upper structure 310 is coupled and fixed to the lower portion of the lifter M, and the force-insertion frame is fixed to the lower portion of the lower structure 320.

If the center error occurs when the part A is forces-inserted into the boss B due to the descending of the lifter M, the center error is corrected by the elastic body 210 provided inside the upper structure 310. Thus, the part A is easily force-inserted into the boss B.

When the part A is force-inserted into the boss B, the force-insertion force is generated. The generated force-insertion force acts on the lower structure 320 and the elastic body 210. Due to the force-insertion force, the lower structure 320 ascends, and the elastic body 210 conducts the translation movement based on the elastic center principle, while the lower structure 320 rises up by the compression gas (g-c) between the lower portion of the upper structure 310 and the upper portion of the lower structure 320. Then, the lower and upper portions of the upper and lower structures 310 and 320 are closely contacted with each other. Hence, this can prevent the bad influence of the force-insertion force on the elastic body 210, thereby preventing the damage of the elastic body 210.

In addition, the force-insertion force measuring sensor 40 provided in the elastic body 210 or the measuring sensor 40 installable in the upper or lower portion of the limiter calculates the force-insertion force, and the displacement sensor 42 installed in perpendicular to the radial direction of the head 332 of the limiter 30 measures the location error correction amount of the remote center compliance device according to the error correction.

In the assembly of the upper and lower structures 310 and 320, the rotation preventing members 328 of the lower structure 320 maintaining the state in which they are inserted into the insertion spaces of the protrusions 314a prevents the endless displacement of the elastic body 210 due to the distortion or the X-axis and Y-axis working force during the translation movement based on the elastic center principle of the elastic body 210.

Since the first and second supports of the remote center compliance device with a single elastic body is configured with the same as the measuring block, the force-insertion force or location displacement can be measured.

In the remote center compliance device with the measuring sensor, the force-insertion force measuring sensor is attached to the limiter or the measuring block and calculates the force-insertion force or the deformation rate generated by the force-insertion force. The displacement sensor measures in real time the location error correction amount of the remote center compliance device caused by the error correction.

In addition, the measuring sensor is provided in the measuring block between the upper and lower structures of the remote center compliance device, including the upper and lower structure and a plurality of elastic bodies, and one side of the measuring block. The measuring sensor is also provided in the limiter. In the force-insertion of the part into the boss, the center error of the boss and the force-insertion part can be corrected, and the location error correction amount according to the force-insertion force or the error correction can be measured.

Further, in the remote center compliance device having a single elastic body, the measuring sensor is provided in the limiter and around the limiter, and measures the location error correction amount according to the force-insertion force or the error correction.

According to the present invention, as the number of parts decreases, the manufacturing process and cost are reduced. In addition, the installation space is reduced, thereby increasing the space utilization. Especially, the LM guide that has been necessarily used as the guide of the lifter can be selectively used. Consequently, the manufacturing cost can be significantly reduced and the product competitiveness of the force-insertion apparatus can be increased.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A remote center compliance device for correcting a center error between a boss and a force-insertion part through a translation based on an elastic center principle, the remote center compliance device comprising:
   upper and lower structures (13, 14);
   a plurality of elastic bodies (16) and a plurality of limiters (30) disposed between the upper and lower structures (13, 14); and
   a force-insertion force measuring sensor (40) attached to the limiters (30) to calculate a force-insertion force acting on the limiters (30).

2. The remote center compliance device of claim 1, wherein the force-insertion force measuring sensor is attached to a side surface of the limiter (30).

3. The remote center compliance device of claim 2, wherein the limiter (30) includes a notch hole (34) for amplifying a variation caused by a force insertion.

4. The remote center compliance device of claim 1, wherein the force-insertion force measuring sensor is a load cell inserted and fixed to an upper or lower portion of the limiter (30).

5. The remote center compliance device of claim 1, further comprising a location displacement measuring unit disposed between the upper structure (13) and the lower structure (14) to measure a relative location displacement between the upper structure (13) and the lower structure (14).

6. The remote center compliance device of claim 1, wherein the force-insertion force measuring sensor includes one of an electrical strain gage and a piezo-electric element.

7. A remote center compliance device for correcting a center error between a boss and a force-insertion part through a translation based on an elastic center principle, the remote center compliance device comprising:
   upper and lower structures (13, 14);
   a plurality of elastic bodies (16) and a plurality of limiters (30) disposed between the upper and lower structures (13, 14);
   a measuring block (110) disposed between the upper and lower structures (13, 14); and
   a force-insertion force measuring sensor (40) disposed at one side of the measuring block (110); and wherein
   the measuring block 110 includes a plurality of insertion holes.

8. A remote center compliance device for correcting a center error between a boss and a force-insertion part through a translation based on an elastic center principle, the remote center compliance device comprising:
   upper and lower structures (13, 14);
   a plurality of elastic bodies (16) and a plurality of limiters (30) disposed between the upper and lower structures (13, 14); and
   a location displacement measuring unit disposed between the upper structure (13) and the lower structure (14) to measure a relative location displacement between the upper structure (13) and the lower structure (14), wherein the location displacement measuring unit includes a measuring sensor for measuring a correction amount using an elastic plate.

9. A remote center compliance device for correcting a center error between a boss and a force-insertion part through a translation based on an elastic center principle, the remote center compliance device comprising:
   upper and lower structures (13, 14);
   a plurality of elastic bodies (16) and a plurality of limiters (30) disposed between the upper and lower structures (13, 14); and
   a location displacement measuring unit disposed between the upper structure (13) and the lower structure (14) to measure a relative location displacement between the upper structure (13) and the lower structure (14), wherein
   the location displacement measuring unit includes a plurality of slide-type displacement measuring sensors arranged perpendicular to one another.

10. A remote center compliance device for correcting a center error between a boss and a force-insertion part through a translation based on an elastic center principle, the remote center compliance device comprising:
    upper and lower structures (13, 14);
    a plurality of elastic bodies (16) and a plurality of limiters (30) disposed between the upper and lower structures (13, 14); and
    a location displacement measuring unit disposed between the upper structure (13) and the lower structure (14) to measure a relative location displacement between the upper structure (13) and the lower structure (14),
    wherein the limiter (30) further includes a force-insertion force measuring sensor (40).

11. The remote center compliance device of claim 10, further comprising:

a measuring block (110) disposed between the upper and lower structures (13, 14); and a force-insertion force measuring sensor (40) disposed at one side of the measuring block (110).

12. The remote center compliance device of claim 7, further comprising a location displacement measuring unit disposed between the upper structure (13) and the lower structure (14) to measure a relative location displacement between the upper structure (13) and the lower structure (14).

13. The remote center compliance device of claim 7, wherein the measuring block (110) includes:

a fixing portion (112) fixed to the upper structure (13); and a measuring portion (114) disposed under the fixing portion (112) and fixed to a location close to the lower structure (14), the measuring portion (114) being spaced apart from the fixing portion (112) by an allowable deformation gap (116) having a predetermined height, the measuring portion (114) providing the force-insertion force measuring sensor (40).

14. The remote center compliance device of claim 13, wherein the measuring portion (114) includes a recess (114*a*) in the center so as to easily attaching the force-insertion force measuring sensor (40), a protrusion (114*b*) is formed at a periphery of the recess (114*a*), the protrusion (114*b*) having a sloped surface (114*a*) inclined from the end to the center so as to provide a constant bending due to the force-insertion force acting on the lower structure (14).

15. The remote center compliance device of claim 13, wherein the allowable deformation gap (116) restrict the bending of the measuring portion (114) in order not to exceed an elastic limit of a material such that the measuring portion (114) are bent by a repulsive force based on the force-insertion force acting on the lower structure (14) and is restored to an original state.

16. The remote center compliance device of claim 13, further comprising a process space between the fixing portion and the measuring portion in the deformation gap (116) to a predetermined height in order for easy process, and the fixing block (40) is fixed in the process space such that the deformation gap does not exceed the elastic limit of the material by height deviation of the process space and the fixing block (140).

17. The remote center compliance device of claim 7, wherein the measuring block (120) includes a fixing portion (122) fixed to the upper structure (13), and a measuring portion (124) disposed under the fixing portion (122) and spaced apart by an allowable deformation gap (126);

the measuring block (124) includes a recess (124*a*) for the force-insertion force measuring sensor (40) in the center, and a protrusion (124*b*) formed at periphery of the recess (124*a*);

the protrusion (124*b*) is cut into a plurality of unit pieces at regular intervals;

the fixing portion (122) and the measuring portion (124) include a plurality of insertion holes (128) into which a plurality of the limiters (30) are inserted, and a plurality of mount spaces (129) at locations where the elastic body (16) is disposed; and the remote center compliance device further includes a plurality of auxiliary blocks (130) in the mount spaces, the auxiliary blocks (130) being fixed between the unit pieces of the measuring portion by a coupling member so as to fix one end of the elastic body (16).

18. The remote center compliance device of claim 17, wherein an upper portion of the auxiliary block (130) is fixed to the measuring portion (124), and is spaced apart from the upper structure (13) by a predetermined distance.

19. The remote center compliance device of claim 17, wherein the protrusion (124*b*) includes a sloped surface (124*c*) inclined from the end to the center so as to provide a constant bending due to the force-insertion force acting on the lower structure (14).

20. The remote center compliance device of claim 17, wherein the allowable deformation gap (126) restrict the bending of the measuring portion (124) in order not to exceed an elastic limit of a material such that the measuring portion (124) are bent by a repulsive force based on the force-insertion force acting on the lower structure (14) and is restored to an original state.

21. The remote center compliance device of claim 17, further comprising a process space between the fixing portion and the measuring portion in the deformation gap (126) to a predetermined height in order for easy process, and the fixing block (40) is fixed in the process space such that the deformation gap does not exceed the elastic limit of the material by height deviation of the process space and the fixing block (140).

22. The remote center compliance device of claim 7, wherein the measuring block (520) includes:

a fixing portion (522) fixed to the bottom of the upper structure (13); and a cross-shaped measuring portion (524) disposed under the fixing portion (522).

23. The remote center compliance device of claim 22, wherein the fixing portion (522) includes a protrusion (526) in the center and is tightly connected to a bottom surface (13*b*) of the upper structure (13), a recess surface (528) is formed in a direction of the measuring portion (524), and the measuring sensor (40) is attached to the recess surface (528).

24. The remote center compliance device of claim 22, wherein the cross-shaped measuring portion (524) includes a measuring portion (523) recessed by at least one step (532) at a cross-shaped lower end, and the force-insertion force measuring sensor (40) is attached thereto.

25. The remote center compliance device of claim 22, wherein the cross-shaped measuring portion (524) includes a through hole (524*d*) formed in an inside of the cross-shaped measuring portion (524).

26. The remote center compliance device of claim 7, further comprising a location displacement measuring unit disposed between the upper and lower structures (13, 14) to measure a relative location displacement between the upper and lower structures (13, 14).

27. The remote center compliance device of claim 7, wherein the limiter (30) further includes a force-insertion force measuring sensor (40).

28. The remote center compliance device of claim 7, wherein the force-insertion force measuring sensor includes one of an electrical strain gage and a piezo-electric element.

29. A remote center compliance device for correcting a center error between a boss and a force-insertion part through a translation based on an elastic center principle, the remote center compliance device comprising:

upper and lower structures (13, 14);

a plurality of elastic bodies (210) and a plurality of limiters (30) disposed between the upper and lower structures (13, 14);

a plurality of disks (212) disposed between the upper and lower structures (13, 14) and having a predetermined slope;

first and second supports (214, 216) stacked at predetermined distance and disposed on both ends of the disks (212), the first and second supports (214, 216) including a protrusion (216a) and a recess (214a) having the same slope and a plurality of coupling holes;

an elastic body (210) including a filler (218) for elastically connecting the disks (212) stacked between the first and second supports (214, 216), the elastic body (210) being fixed to the upper and lower structures (13, 14) through the coupling holes;

the limiter (30) disposed between the upper and lower structures (13, 14), the limiter (30) including a screw part (336) fixed to one of the upper and lower structures, and a head part (332) for spacing the other of the upper and lower structures by a predetermined distance; and a force-insertion force measuring sensor (40) attached to the limiter (30) to calculate the force-insertion force acting on the limiter (30).

30. The remote center compliance device of claim 29, wherein the force-insertion force measuring sensor is attached to a side surface of the limiter (30).

31. The remote center compliance device of claim 29, wherein the force-insertion force measuring sensor is a load cell inserted and fixed to the upper or lower portion of the limiter (30).

32. The remote center compliance device of claim 29, wherein the disk (212) has the slope (θ) inclined from an inner side to an outer side.

33. The remote center compliance device of claim 29, wherein the slope (θ) of the disk (212) ranges from 2° to 15°.

34. The remote center compliance device of claim 29, further comprising:

upper and lower structures (310, 320) disposed in the first and second supports (214, 216) of the elastic body (210) and connected together by a coupling member; and a limiter (30) disposed between the upper and lower structures (310, 320), the limiter (30) including a screw part (336) fixed to one of the upper and lower structures (310, 320), and a head part (332) for spacing the other of the upper and lower structures (310, 320) by a predetermined distance, such that the elastic body (210) is prevented from buckling and damage due to a tensile force and a force-insertion force caused by weight of the limiter 30.

35. The remote center compliance device of claim 34, wherein the upper structure (310) includes a plurality of coupling holes at the upper portion (312), a flange (314) extending downward, and a receiving space (316) defined by an inner side of the flange (314), the receiving space (316) receiving the elastic body (210) and being connected to the first support (214) of the elastic body (210), such that the elastic body (210) is not interfered during a translation movement; and the lower structure (320) is coupled to the second support (216) of the elastic body (210) and disposed in the receiving space (316) of the flange (314), such that the lower structure (320) is spaced apart from the inner wall of the flange (314) in order for the elastic body (210) not to contact the inner wall of the flange (314) during the translation movement of the elastic body (210).

36. The remote center compliance device of claim 34, further comprising a plurality of wrench grooves (338) formed at the head part (332) of the limiter (30) and into which a wrench is inserted to transfer a coupling force to make an easy connection of the screw (336) to one of the upper and lower structures (310, 320).

37. The remote center compliance device of claim 34, wherein the upper structure (310) includes protrusions (314a) at a lower portion, the protrusions (314a) having an insertion space recessed upward from an end portion;

the lower structure (320) includes a lower portion (322), a protrusion (324) producing from the lower portion (322) to a predetermined height, a coupling hole (326) defined in the center of the protrusion (324), and a plurality of rotation preventing members (328) inserted into the insertion space of the protrusion (314a) at a periphery of the lower portion (322).

38. The remote center compliance device of claim 29, further comprising a displacement measuring sensor disposed at the head part of the limiter to measure the displacement of the limiters.

39. The remote center compliance device of claim 29, further comprising:

a measuring block (110) disposed between the upper and lower structures (13, 14); and a force-insertion force measuring sensor (40) disposed at one side of the measuring block (110).

40. The remote center compliance device of claim 29, wherein the force-insertion force measuring sensor includes one of an electrical strain gage and a piezo-electric element.

41. A remote center compliance device for correcting a center error between a boss and a force-insertion part through a translation based on an elastic center principle, the remote center compliance device comprising:

upper and lower structures (13, 14);

a plurality of elastic bodies (16) and a plurality of limiters (30) disposed between the upper and lower structures (13, 14); and a displacement sensor provided at one of the upper and lower structures (13, 14) to measure a displacement of the limiters.

42. The remote center compliance device of claim 41, wherein the limiter (30) further includes a force-insertion force measuring sensor (40).

43. The remote center compliance device of claim 41, further comprising a location displacement measuring unit disposed between the upper and lower structures (13, 14) to measure a relative location displacement between the upper and lower structures (13, 14).

44. The remote center compliance device of claim 41, wherein the displacement sensor includes one of a potentiometer, a linear scale, an LVDT.

* * * * *